US008271492B2

(12) United States Patent
Nagai et al.

(10) Patent No.: US 8,271,492 B2
(45) Date of Patent: Sep. 18, 2012

(54) COMPUTER FOR IDENTIFYING CAUSE OF OCCURRENCE OF EVENT IN COMPUTER SYSTEM HAVING A PLURALITY OF NODE APPARATUSES

(75) Inventors: Takayuki Nagai, Machida (JP); Tomohiro Morimura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 12/529,521

(22) PCT Filed: Apr. 23, 2009

(86) PCT No.: PCT/JP2009/001857

§ 371 (c)(1), (2), (4) Date: Sep. 1, 2009

(87) PCT Pub. No.: WO2010/122604

PCT Pub. Date: Oct. 28, 2010

(65) Prior Publication Data

US 2012/0023115 A1 Jan. 26, 2012

(51) Int. Cl.
*G06F 7/00* (2006.01)
*G06F 17/30* (2006.01)

(52) U.S. Cl. .......................... 707/736; 707/755; 707/756

(58) Field of Classification Search ........................ None
See application file for complete search history.

(56) References Cited

U.S. PATENT DOCUMENTS

| | | | | |
|---|---|---|---|---|
| 7,076,688 | B2 | 7/2006 | Yamamoto | |
| 7,107,185 | B1 | 9/2006 | Yemini et al. | |
| 7,293,194 | B2 | 11/2007 | Kawamura et al. | |
| 2003/0099202 | A1 * | 5/2003 | Lear et al. | 370/238 |
| 2008/0320495 | A1 * | 12/2008 | Akiyama et al. | 719/318 |

FOREIGN PATENT DOCUMENTS

| | | |
|---|---|---|
| JP | 2005-025483 A | 1/2005 |
| JP | 2006-164080 A | 6/2006 |

* cited by examiner

*Primary Examiner* — Jay Morrison
(74) *Attorney, Agent, or Firm* — Foley & Lardner LLP

(57) ABSTRACT

To reduce the burden of processing for completing event cause information, which is carried out when a management target node apparatus is added, removed or changed.
A management computer determines whether or not partial change to add, delete or change part of information related to an event related to an added, removed or changed node apparatus can be performed or not on the event cause information. The management computer adds, deletes or changes the part of information with respect to the event cause information, when the result of the determination is affirmative.

12 Claims, 25 Drawing Sheets

FIG.6A 13310 13320 13330 13340 13300

| DRIVE NAME | iSCSI INITIATOR NAME | CONNECTED iSCSI TARGET | LUN |
|---|---|---|---|
| E: | com.aaa.sv1 | com.aaa.sto1 | 0 |
| F: | com.aaa.sv1 | com.aaa.sto1 | 1 |
| : | : | : | : |

FIG.6B 13310 13320 13330 13340 13300

| DRIVE NAME | iSCSI INITIATOR | CONNECTED iSCSI TARGET | LUN |
|---|---|---|---|
| E: | com.aaa.sv2 | com.aaa.sto2 | 0 |
| : | : | : | : |

FIG.6C 13310 13320 13330 13340 13300

| DRIVE NAME | iSCSI INITIATOR | CONNECTED iSCSI TARGET | LUN |
|---|---|---|---|
| E: | com.aaa.sv3 | com.aaa.sto3 | 0 |
| : | : | : | : |

FIG.7A 13410 13420 13430 13400

| PORT ID | MAC ADDRESS | iSCSI INITIATOR NAME |
|---|---|---|
| LAN1 | 11:11:11:11:11:11 | com.aaa.sv1 |
| : | : | : |

FIG.7B 13410 13420 13430 13400

| PORT ID | MAC ADDRESS | iSCSI INITIATOR NAME |
|---|---|---|
| LAN1 | 11:11:11:11:11:21 | com.aaa.sv2 |
| : | : | : |

FIG.7C 13410 13420 13430 13400

| PORT ID | MAC ADDRESS | iSCSI INITIATOR NAME |
|---|---|---|
| LAN1 | 11:11:11:11:11:31 | com. aaa.sv3 |
| : | : | : |

| VOLUME ID | CAPACITY | TARGET ID | LUN |
|---|---|---|---|
| VOL1 | 20GB | TG1 | 0 |
| VOL2 | 20GB | TG1 | 1 |
| VOL3 | 20GB | TG2 | 0 |
| VOL4 | 20GB | TG2 | 1 |
| VOL5 | 40GB | TG3 | 0 |
| VOL6 | 40GB | TG3 | 1 |
| : | : | : | : |

| TARGET ID | iSCSI TARGET NAME | ACCESIBLE iSCSI INITIATOR |
|---|---|---|
| TG1 | com.aaa.sto1 | com.aaa.sv1, com.aaa.sv11 |
| TG2 | com.aaa.sto2 | com.aaa.sv2 |
| TG3 | com.aaa.sto3 | com.aaa.sv3 |
| : | : | : |

| PORT ID (23410) | MAC ADDRESS (23420) | TARGET ID (23430) |
| --- | --- | --- |
| PORT1 | 22:22:22:22:22:11 | TG1, TG2 |
| PORT2 | 22:22:22:22:22:12 | TG3 |
| : | : | : |

| SWITCH PORT ID | MAC ADDRESS | CONNECTED PORT MAC ADDRESS |
|---|---|---|
| SWPT1 | 33:33:33:33:33:11 | 11:11:11:11:11:11 |
| SWPT2 | 33:33:33:33:33:12 | 11:11:11:11:11:21 |
| SWPT3 | 33:33:33:33:33:13 | 11:11:11:11:11:31 |
| SWPT4 | 33:33:33:33:33:14 | 22:22:22:22:22:11 |
| SWPT5 | 33:33:33:33:33:15 | 22:22:22:22:22:12 |
| : | : | : |

| SWITCH PORT ID | MAC ADDRESS | CONNECTED PORT MAC ADDRESS |
|---|---|---|
| SWPT1 | 33:33:33:33:33:21 | 11:11:11:11:11:11 |
| SWPT2 | 33:33:33:33:33:22 | 11:11:11:11:11:21 |
| SWPT3 | 33:33:33:33:33:23 | 22:22:22:22:22:11 |
| : | : | : |

FIG.12A 32110 32120 32130 32140 32150 32100

| IP ADDRESS | NODE TYPE | NODE ID | USER ID | PASS-WORD |
|---|---|---|---|---|
| 192.168.5.5 | HOST COMPUTER | HOST1 | user | pwd |
| 192.168.5.6 | HOST COMPUTER | HOST2 | user | pwd |
| 192.168.5.10 | STORAGE APPATATUS | SYS1 | Admin | admin |
| 192.168.5.20 | IP SWITCH | SW1 | test | test |
| : | : | : | : | : |

FIG.12B 32110 32120 32130 32140 32150 32100

| IP ADDRESS | NODE TYPE | NODE ID | USER ID | PASS-WORD |
|---|---|---|---|---|
| 192.168.5.5 | HOST COMPUTER | HOST 1 | user | pwd |
| 192.168.5.6 | HOST COMPUTER | HOST 2 | user | pwd |
| 192.168.5.7 | HOST COMPUTER | HOST 3 | user | pwd |
| 192.168.5.10 | STORAGE APPARATUS | SYS1 | Admin | admin |
| 192.168.5.20 | IP SWITCH | SW1 | test | test |
| 192.168.5.21 | IP SWITCH | SW2 | test | test |
| : | : | : | : | : |

| SYSTEM ID (32210) | VOLUME ID (32220) | PORT ID (32230) | CONNECTED HOST ID (32240) | CONNECTED DRIVE ID (32250) | CONNECTED PORT ID (32260) |
|---|---|---|---|---|---|
| SYS1 | VOL1 | PORT1 | HOST1 | E: | LAN1 |
| | VOL2 | PORT1 | HOST1 | F: | LAN1 |
| | VOL3 | PORT1 | HOST2 | E: | LAN1 |
| : | : | : | : | : | : |

| SYSTEM ID (32210) | VOLUME ID (32220) | PORT ID (32230) | CONNECTED HOST ID (32240) | CONNECTED DRIVE ID (32250) | CONNECTED PORT ID (32260) |
|---|---|---|---|---|---|
| SYS1 | VOL1 | PORT1 | HOST1 | E: | LAN1 |
| | VOL2 | PORT1 | HOST1 | F: | LAN1 |
| | VOL3 | PORT1 | HOST2 | E: | LAN1 |
| | VOL5 | PORT2 | HOST3 | E: | LAN1 |
| : | : | : | : | : | : |

| SYSTEM ID (32310) | PORT ID (32320) | IP SWITCH ID (32330) | SWITCH PORT ID (32340) | CONNECTED HOST ID (32350) | CONNECTED PORT ID (32360) |
|---|---|---|---|---|---|
| SYS1 | PORT 1 | SW1 | SWPT1, SWPT4 | HOST1 | LAN1 |
| | | SW1 | SWPT2, SWPT4 | HOST2 | LAN1 |
| : | : | : | : | : | : |

| SYSTEM ID (32410) | PORT ID (32420) | IP SWITCH ID (32430) | SWITCH PORT ID (32440) | CONNECTED HOST ID (32450) | CONNECTED PORT ID (32460) |
|---|---|---|---|---|---|
| SYS1 | PORT 1 | SW1 | SWPT1, SWPT4 | HOST1 | LAN1 |
| | | SW2 | SWPT1, SWPT2 | | |
| | | SW1 | SWPT2, SWPT4 | HOST2 | LAN1 |
| | | SW2 | SWPT1, SWPT2 | | |
| | PORT 2 | SW1 | SWPT3, SWPT5 | HOST3 | LAN1 |
| : | : | : | : | : | : |

| MODEL ID | Rule1 |
|---|---|
| MONI-TORED EVENT | HOST COMPUTER LOGICAL DRIVE ERROR, STORAGE APPARATUS VOLUME ERROR |
| CAUSE | STORAGE APPARATUS VOLUME FAILURE |

| MODEL ID | Rule2 |
|---|---|
| MONI-TORED EVENT | HOST COMPUTER PORT ERROR, IP SWITCH I/O PORT NORMAL, STORAGE APPARATUS I/O PORT ERROR |
| CAUSE | STORAGE APPARATUS I/O PORT FAILURE |

FIG.16A 33910 33930 33900

| EVENT PROPAGATION MODEL ID | | | Rule1 | | | ... |
|---|---|---|---|---|---|---|
| CAUSE / MONITORED EVENT | | | SYS1 | | | ... |
| | | | VOL1 | VOL2 | VOL3 | ... |
| | | | FAIL-URE | FAIL-URE | FAIL-URE | ... |
| SYS1 | VOL1 | ERROR | O | - | - | ... |
| | VOL2 | ERROR | - | O | - | ... |
| | VOL3 | ERROR | - | - | O | ... |
| | VOL5 | ERROR | - | - | - | ... |
| HOST1 | E: | ERROR | O | - | - | ... |
| | F: | ERROR | - | O | - | ... |
| HOST2 | E: | ERROR | - | - | O | ... |
| : | : | : | : | : | : | ... |

| EVENT PROPAGATION MODEL ID | | | Rule1 | | | | ... |
|---|---|---|---|---|---|---|---|
| CAUSE / MONITORED EVENT | | | SYS1 | | | | ... |
| | | | VOL1 | VOL2 | VOL3 | VOL5 | ... |
| | | | FAIL-URE | FAIL-URE | FAIL-URE | FAIL-URE | ... |
| SYS1 | VOL1 | ERROR | O | - | - | - | ... |
| | VOL2 | ERROR | - | O | - | - | ... |
| | VOL3 | ERROR | - | - | O | - | ... |
| | VOL5 | ERROR | - | - | - | O | ... |
| HOST1 | E: | ERROR | O | - | - | - | ... |
| | F: | ERROR | - | O | - | - | ... |
| HOST2 | E: | ERROR | - | - | O | - | ... |
| HOST3 | E: | ERROR | - | - | - | O | ... |
| : | : | : | : | : | : | : | ... |

| EVENT PROPAGATION MODEL ID | | | Rule2 | ... |
|---|---|---|---|---|
| CAUSE / MONITORED EVENT | | | SYS1 | ... |
| | | | PORT1 | ... |
| | | | FAILURE | ... |
| SYS1 | PORT1 | ERROR | O | ... |
| | PORT2 | ERROR | - | ... |
| HOST1 | LAN1 | ERROR | O | ... |
| HOST2 | LAN1 | ERROR | O | ... |
| SW1 | SWPT1 | NORMAL | O | ... |
| | SWPT2 | NORMAL | O | ... |
| | SWPT3 | NORMAL | - | ... |
| | SWPT4 | NORMAL | O | ... |
| | SWPT5 | NORMAL | - | ... |
| : | : | : | : | ... |

| EVENT PROPAGATION MODEL ID | | | Rule2 | | ... |
|---|---|---|---|---|---|
| CAUSE / MONITORED EVENT | | | SYS1 | | ... |
| | | | PORT1 | PORT2 | ... |
| | | | FAILURE | FAILURE | ... |
| SYS1 | PORT1 | ERROR | O | - | ... |
| | PORT2 | ERROR | - | O | ... |
| HOST1 | LAN1 | ERROR | O | - | ... |
| HOST2 | LAN1 | ERROR | O | - | ... |
| HOST3 | LAN1 | ERROR | - | O | ... |
| SW1 | SWPT1 | NORMAL | O | - | ... |
| | SWPT2 | NORMAL | O | - | ... |
| | SWPT3 | NORMAL | - | O | ... |
| | SWPT4 | NORMAL | O | - | ... |
| | SWPT5 | NORMAL | - | O | ... |
| SW2 | SWPT1 | NORMAL | O | - | ... |
| | SWPT2 | NORMAL | O | - | ... |
| : | : | : | : | : | ... |

| DATA MODEL | | | APPLICATION TOPOLOGY | PARTIAL DEVEL-OPMENT |
|---|---|---|---|---|
| HOST COPUTER | IP SWITCH | STORAGE APPARATUS | | |
| LOGICAL VOLUME | - | VOLUME, PORT | VOLUME TOPOLOGY MANAGEMENT TABLE | YES |
| PORT | PORT | PORT | IP NETWORK TOPOLOGY MANAGEMENT TABLE | NO |
| : | : | : | : | : |

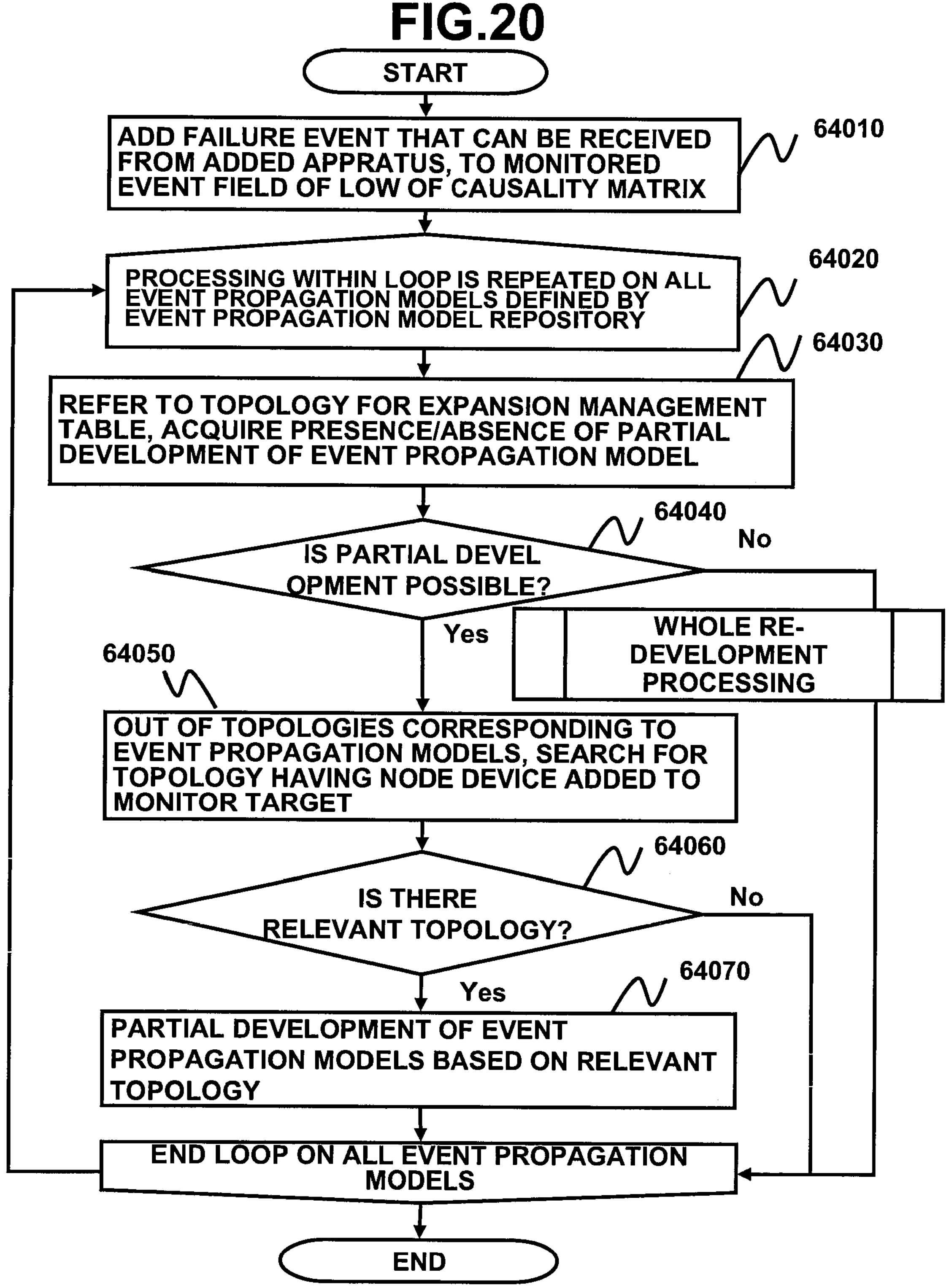
FIG.20
START
ADD FAILURE EVENT THAT CAN BE RECEIVED FROM ADDED APPRATUS, TO MONITORED EVENT FIELD OF LOW OF CAUSALITY MATRIX
64010
PROCESSING WITHIN LOOP IS REPEATED ON ALL EVENT PROPAGATION MODELS DEFINED BY EVENT PROPAGATION MODEL REPOSITORY
64020
REFER TO TOPOLOGY FOR EXPANSION MANAGEMENT TABLE, ACQUIRE PRESENCE/ABSENCE OF PARTIAL DEVELOPMENT OF EVENT PROPAGATION MODEL
64030
IS PARTIAL DEVEL OPMENT POSSIBLE?
64040
No
Yes
WHOLE RE-DEVELOPMENT PROCESSING
64050
OUT OF TOPOLOGIES CORRESPONDING TO EVENT PROPAGATION MODELS, SEARCH FOR TOPOLOGY HAVING NODE DEVICE ADDED TO MONITOR TARGET
IS THERE RELEVANT TOPOLOGY?
64060
No
Yes
64070
PARTIAL DEVELOPMENT OF EVENT PROPAGATION MODELS BASED ON RELEVANT TOPOLOGY
END LOOP ON ALL EVENT PROPAGATION MODELS
END

COMPUTER FOR IDENTIFYING CAUSE OF OCCURRENCE OF EVENT IN COMPUTER SYSTEM HAVING A PLURALITY OF NODE APPARATUSES

TECHNICAL FIELD

The present invention relates to technology for identifying a cause of the occurrence of an event in a computer system having a plurality of node apparatuses.

BACKGROUND ART

The technology for managing a computer system having a plurality of node apparatuses is known. Management of this type of computer system is executed by, for example, a computer coupled to each of the node apparatuses (to be referred to as "management computer" hereinafter). The management computer detects a failure and identifies the cause of the occurrence of the failure (see Patent Citation 1, for example).

PATENT CITATION 1

United States Patent Application No. 7107185

DISCLOSURE OF INVENTION

[Technical Problem ]

It is considered that when a failure occurs in a certain node apparatus, a failure occurs at the same time in another node apparatus coupled to this node apparatus. This means that a plurality of failures occur in the computer system. The management computer identifies the root cause of the failure from the plurality of failures, and submits the identified failure (the root cause) to a manager.

A failure is an example of an event. The root cause of the plurality of failures is identified by referring to information representing the relationship between each event and the cause of the occurrence of the event (hereinafter referred to as "event cause information").

Every time when a management target node apparatus is added, removed or changed, the management computer discards failure cause information and creates new event cause information to identify the cause of the occurrence of a failure generated in the computer system having the added, removed or changed node apparatus. However, this work is a burden to the management computer. The greater the number of management target node apparatuses, the greater the burden becomes.

This type of problem can happen also in technology for identifying the cause of the occurrence of an event other than a failure.

An object of the present invention is, therefore, to reduce the burden of processing for completing the event cause information, which is carried out when the management target node apparatus is added, removed or changed.

[Technical Solution ]

A management computer determines whether it is possible to perform partial change by adding, deleting or changing part of information on an event related to an added, removed or changed node apparatus, with respect to event cause information. If the result of this determination is affirmative, the management computer adds, partially deletes or partially changes the information section with respect to the event cause information. Note that when a normal node apparatus is added, removed or changed, event cause information is created from an event cause model for not only this normal node apparatus but also for a node apparatus belonging to topology application information to which the normal node apparatus relates to. However, partial change may be performed for part of event cause information of the added, removed or changed node apparatus. In this case part of the event cause information that is not related to the added, removed or changed node apparatus is prevented from being updated, and at the same time part of the event cause information related to the added, removed or changed node apparatus is changed.

Specifically, when, for example, a node apparatus is added to the management target node apparatuses, the management computer may determine whether partial expansion of each event cause model is possible or not. Whether partial expansion is possible or not is determined based on whether the added, removed or changed node apparatus corresponds to a server apparatus belonging to the topology application information or to a client apparatus coupled to a host device. Specifically, when the added, removed or changed node apparatus is a server apparatus, it is expected to affect the client apparatus belonging to the topology application information, and therefore it is determined that partial expansion is cannot performed. On the other hand, when the added, removed or changed node apparatus is a client apparatus, the server apparatus belonging to other topology application information might not be affected, and therefore it is determined that partial expansion can be performed.

The server apparatus is a node apparatus that provides a certain service to the client apparatus, and examples of the server apparatus include a computer and a storage apparatus. However, the server apparatus may be any apparatus that provides some sort of services. A system form having a apparatus providing a service and a apparatus provided with a service is called "client-server model." When the topology application information is based on some sort of a client-server model in rule cause model, knowledge about which node apparatus is the server apparatus can be identified by a topology information type and the topology application information. For example, in the case of a volume topology, information for determining that the storage apparatus is the server apparatus is included in a computer program or the topology application information.

When partial expansion of the event cause model can be performed, partial expansion of the event cause model may be carried out based on a topology having the added node apparatus. Note that the "event cause model" is information representing models of the event type and the cause of the occurrence of this type of event. The "event type" is defined by the condition of a certain type of an element of a certain type of a node apparatus. "Expansion of the event cause model" means that event cause sub-information according to the event cause model is added to the event cause information. "Partial expansion of the event cause model" means that part of the event cause sub-information according to the event cause mode (for example, information on an event related to an added node apparatus and on the cause of the occurrence of the event (information section)) is added to the event cause information. The event cause information has a plurality of event cause sub-information items corresponding to a plurality of event cause models. The "event cause sub-information" is information representing the relationship between each event related to the corresponding event cause model and the cause of the occurrence of each event.

Furthermore, when it is determined that partial expansion of the event cause model cannot be performed, the management computer may delete the event cause sub-information corresponding to the event cause model from the event cause information, and expand the event cause model again. Specifically, the management computer adds, to the event cause information, information on an even related to the added node apparatus and on the cause of the occurrence of the event.

When the node apparatus is removed from the management target node apparatuses, the management computer may determine whether it is possible to perform partial deletion for deleting, from the event cause information, the information on the event of this node apparatus and on the cause of the occurrence of this event (information section). When it is determined that partial deletion can be performed, the management computer deletes the information section only from the event cause information. When, on the other hand, it is determined that partial deletion cannot be performed, the management computer deletes, from the event cause information, the event cause sub-information on the removed node apparatus, and expands the event cause model corresponding to the deleted sub-information again.

When the node apparatus is changed, the management computer may determine whether it is possible to perform partial change for changing the information on the event of the node apparatus and on the cause of the occurrence of the event (information section). When it is determined that partial change can be performed, the management computer deletes the information section from the event cause information, and carries out partial expansion of the event cause model on the basis of the topology having this node apparatus.

The processing carried out by the management computer according to the present invention can be performed by allowing a processor within the management computer to execute the computer program. The computer program may be installed from a distant server or from a storage medium (for example, a CD-ROM, DVD (Digital Versatile Disk)) or other field-portable storage medium). Note that at least part of the processing performed by the management computer may be realized by a hardware circuit.

BRIEF DESCRIPTION OF DRAWINGS

FIG. 1 shows a composition of a computer system according to Embodiment 1 of the present invention.

FIG. 2 shows a composition of a host computer 10000.

FIG. 3 shows a composition of a storage apparatus 20000.

FIG. 4 shows a composition of a management server 30000.

FIG. 5 shows a composition of an IP switch 40000.

[FIG. 6A]

FIG. 6A shows a composition of a logical drive management table 13300 of a first host computer.

[FIG. 6B]

FIG. 6B shows a composition of the logical drive management table 13300 of a second host computer.

[FIG. 6C]

FIG. 6C shows a composition of the logical drive management table 13300 of a third host computer.

[FIG. 7A]

FIG. 7A shows a composition of an iSCSI initiator management table 13400 of the first host computer.

[FIG. 7B]

FIG. 7B shows a composition of the iSCSI initiator management table 13400 of the second host computer.

[FIG. 7C]

FIG. 7C shows a composition of the iSCSI initiator management table 13400 of the third host computer.

[FIG. 8]

FIG. 8 shows a composition of a volume management table 23200.

[FIG. 9]

FIG. 9 shows a composition of an iSCSI target management table 23300.

[FIG. 10]

FIG. 10 shows a composition of an I/O port management table 23400.

FIG. 11A shows a composition of a switch port management table 42100 of a first IP switch.

FIG. 11B shows a composition of the switch port management table 42100 of a second IP switch.

[FIG. 12A]

FIG. 12A shows an example of a composition of a managed apparatus management table 32100.

[FIG. 12B]

FIG. 12B shows another example of the composition of the managed apparatus management table 32100.

[FIG. 13A]

FIG. 13A shows an example of a composition of a volume topology management table 32200.

[FIG. 13B]

FIG. 13B shows another example of the composition of the volume topology management table 32200.

[FIG. 14A]

FIG. 14A shows an example of a composition of an IP network topology management table 32300.

[FIG. 14B]

FIG. 14B shows another example of the composition of the IP network topology management table 32300.

[FIG. 15A]

FIG. 15A shows a composition of an event propagation model “Rule 1”.

[FIG. 15B]

FIG. 15B shows a composition of an event propagation model “Rule 2”.

[FIG. 16A]

FIG. 16A shows an example of a low of causality matrix 33900 related to the event propagation model “Rule 1”.

[FIG. 16B]

FIG. 16B shows another example of a composition of the low of causality matrix 33900 related to the event propagation model “Rule 2”.

[FIG. 16C]

FIG. 16C shows an example of the composition of the low of causality matrix 33900 related to the event propagation model “Rule 2”.

[FIG. 16D]

FIG. 16D shows another example of the composition of the low of causality matrix 33900 related to the event propagation model “Rule 2”.

FIG. 17 is a flowchart of managed apparatus addition processing.

FIG. 18 is a flowchart of composition information acquisition processing.

[FIG. 19]

FIG. 19 shows a composition of an topology for expansion management table 33800.

[FIG. 20]

FIG. 20 is a flowchart of model expansion processing performed when a node apparatus is added.

FIG. 21 is a flowchart of whole re-expansion processing.

FIG. 22 is a flowchart of model re-expansion processing performed when a node apparatus is removed in Embodiment 2 of the present invention.

FIG. 23 is a part of the flowchart of the model re-expansion processing performed when composition information is acquired in Embodiment 3 of the present invention.

FIG. 24 is the rest of the flowchart of the model re-expansion processing performed when the composition information is acquired in Embodiment 3 of the present invention.

EXPLANATION OF REFERENCE

10000 . . . Host computer
20000 . . . Storage apparatus
30000 . . . Management server
40000 . . . IP switch

BEST MODE FOR CARRYING OUT THE INVENTION

Hereinafter, several embodiments of the present invention will be described with reference to the drawings.

Note that the information items described hereinafter are expressed by "xxx table," "xxx model," "xxx line/column," and so on. However, the information items may be expressed by items other than the data structures of the table, model, line/column and the like.

Moreover, although a computer program is mainly described hereinafter, the program carries out defined processing by being executed by a processor (typically a microprocessor). In this case, a storage resource, such as a memory, and a communication port (communication control device) are used. The processor may be the main subject when explaining the processing performed by the processor executing the program. The processing described using the program as the main subject may be processing carried out by a computer. Furthermore, part of or the entire program may be realized by a dedicated hardware.

Further, the program may be installed from a program distribution server or a storage medium into the computer.

[Mode for the Invention 1]

Figure 1:
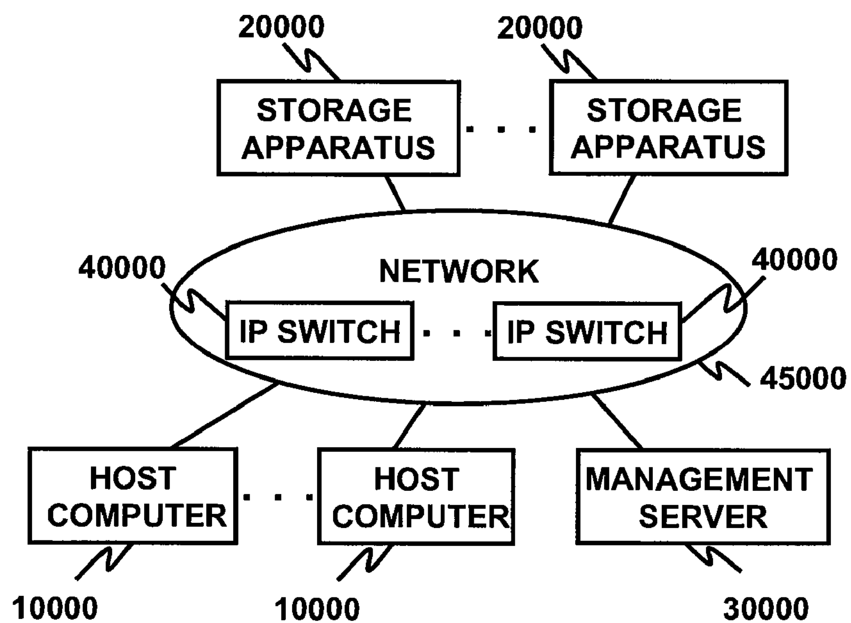
[FIG. 1]

FIG. 1 shows a composition of a computer system according to Embodiment 1 of the present invention.

A network 45000 has a plurality of (or one) IP (Internet Protocol) switches 40000. In place of or in addition to the IP switches 40000, other switch (an FC (Fiber Channel) switch, for example) may be used. The network 45000 is an IP network in Embodiment 1, but other communication network (an FC (Fiber Channel) network, for example) may be adopted in place of or in addition to the IP network.

A plurality of (or one) storage apparatuses 20000, a plurality of (or one) host computers 10000, and a management server 30000 are coupled to the network 45000.

Figure 2:
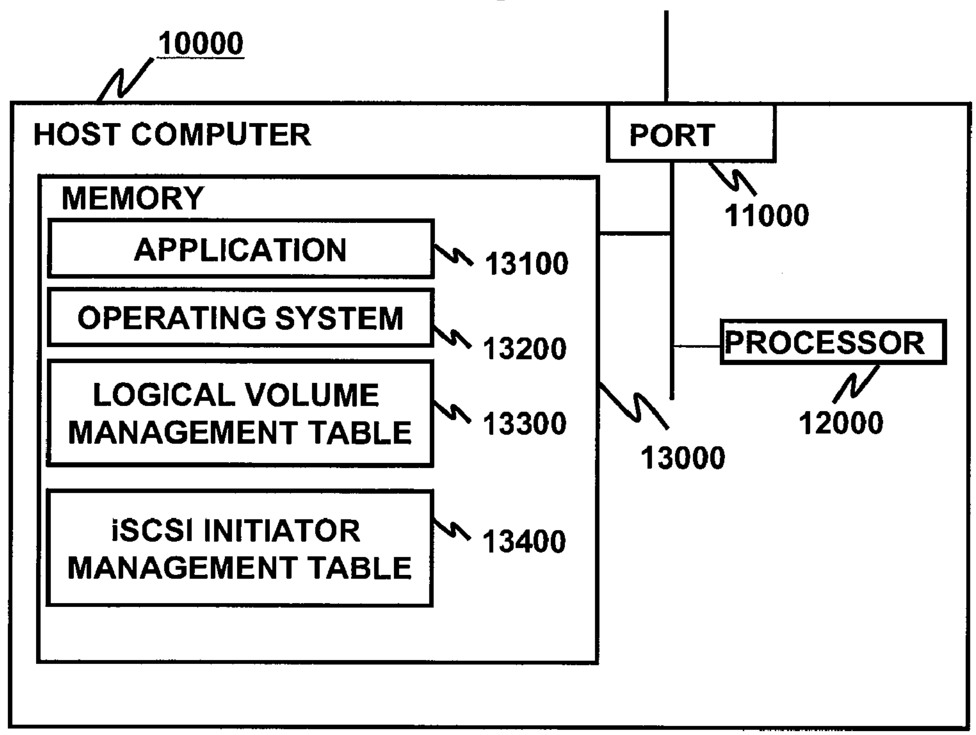
[FIG. 2]

FIG. 2 shows a composition of one of the host computers 10000.

The host computer 10000 has a port 11000, a processor 12000, and a memory 13000, which are coupled to one another via a circuit, such as an internal bus.

Programs and composition information are stored in the memory 13000. The programs include, for example, a work application 13100, and an operating system 13200. The composition information includes a logical drive management table 13300 and a port management table 13400. In place of the memory 13000, part of or the entire memory 13000 may be a magnetic disk or other physical storage apparatus.

The work application 13100 uses a storage area (to be referred to as "logical drive" hereinafter) provided by the operating system 13200, to input/output (to be described as I/O hereinafter) data to/from a host drive.

The operating system 13200 causes the application 13100 to recognize a logical volume within the storage apparatus 20000 as the storage area (logical drive). An I/O request based on I/O to/from the host drive is transmitted from the port 11000 to the storage apparatus 20000 having the logical volume associated with the logical drive.

Note that the port 11000 may be divided into a first port (I/O port) for communicating with the storage apparatus 20000 by means of an iSCSI and a second port (management port) with which the management server 30000 acquires composition information within the host computer 10000.

Figure 3:
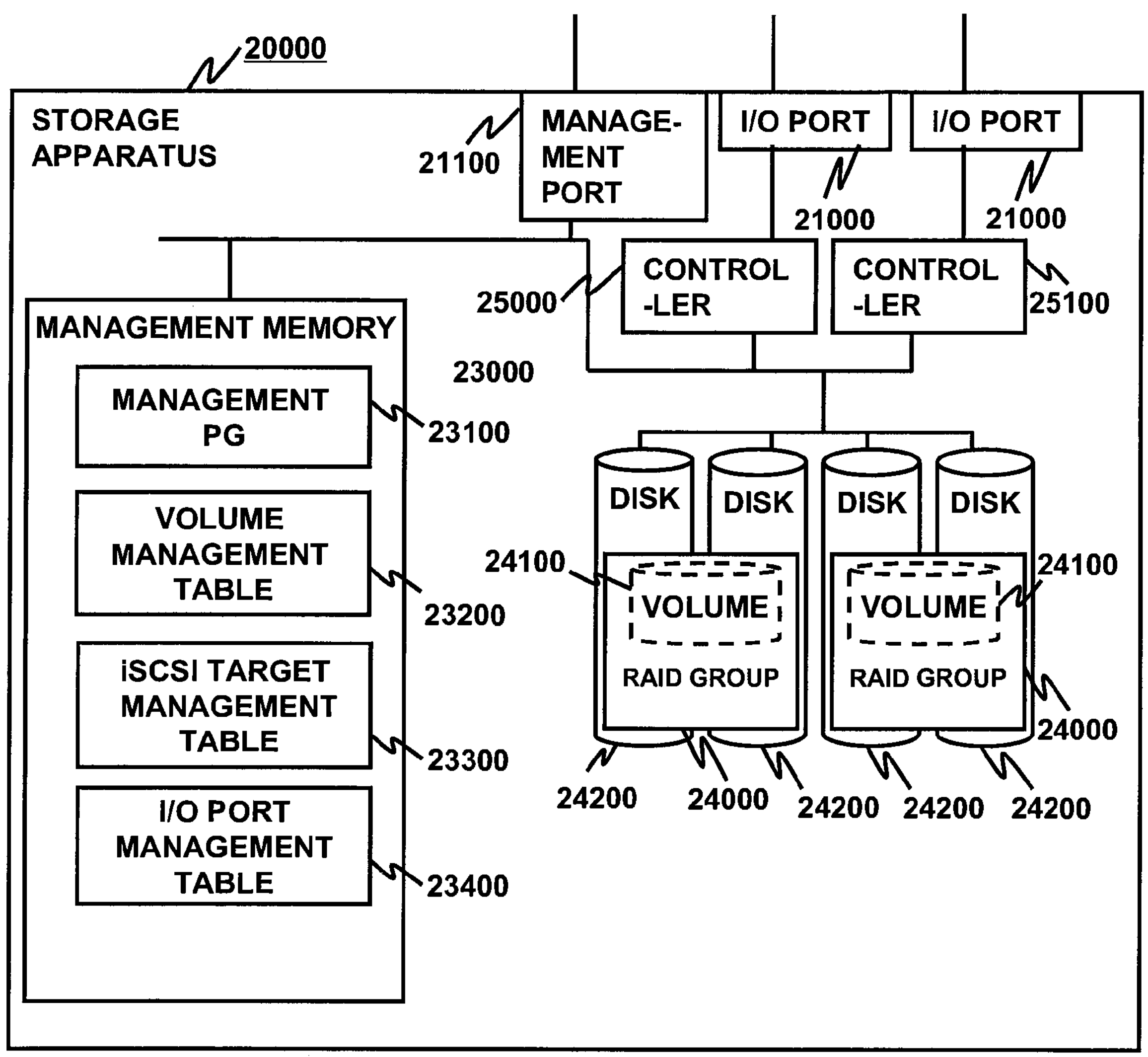
[FIG. 3]

FIG. 3 shows a composition of the storage apparatus 20000. Note that in FIG. 3 (and subsequent FIG. 4) the computer program is abbreviated as "PG."

The storage apparatus 20000 can be largely classified into a storage part and a controller part.

The storage part has a plurality of RAID (Redundant Array of Independent (or Inexpensive) Disks) groups 24000. Each RAID group 24000 has one or a plurality of disk drives (magnetic disk drives, for example) 24200. Each disk drive is coupled to a controller 25000. One or a plurality of logical volumes 24100 are formed based on the RAID groups 24000. As long as each logical volume 24100 is composed using one or more physical storage apparatuses, it is not necessary to adopt the RAID composition. In addition, as long as the storage areas corresponding to the logical volumes are provided, flash memories or other physical storage apparatuses may be used in places of the magnetic disk drives.

The controller part has an I/O port 21000 communicating with the host computer 10000, a management port 21100 communicating with the management server 30000, a management memory 23000 for storing various composition information items, and a controller 25000, which are all coupled to one another via a circuit, such as an internal bus.

The management memory 23000 stores therein a management program 23100, a volume management table 23200, an iSCSI target management table 23300, and a volume management table 23400.

The controller 25000 has a processor for controlling the storage apparatus 20000, and a cache memory for temporarily storing data exchanged with the host computer 10000. The processor writes, into the cache memory, data in accordance with a write request issued by the host computer 10000, and writes the data from the cache memory a disk drive 24200 that is the basis for a logical volume specified by the write request. The processor further reads out data from a disk drive 24200 that is the basis for a logical volume specified by a read request issued by the host computer 10000, writes the read data into the cache memory, and transmits the data to the host computer 10000.

The storage part and the controller part described above may exist in separate housings.

Figure 4:
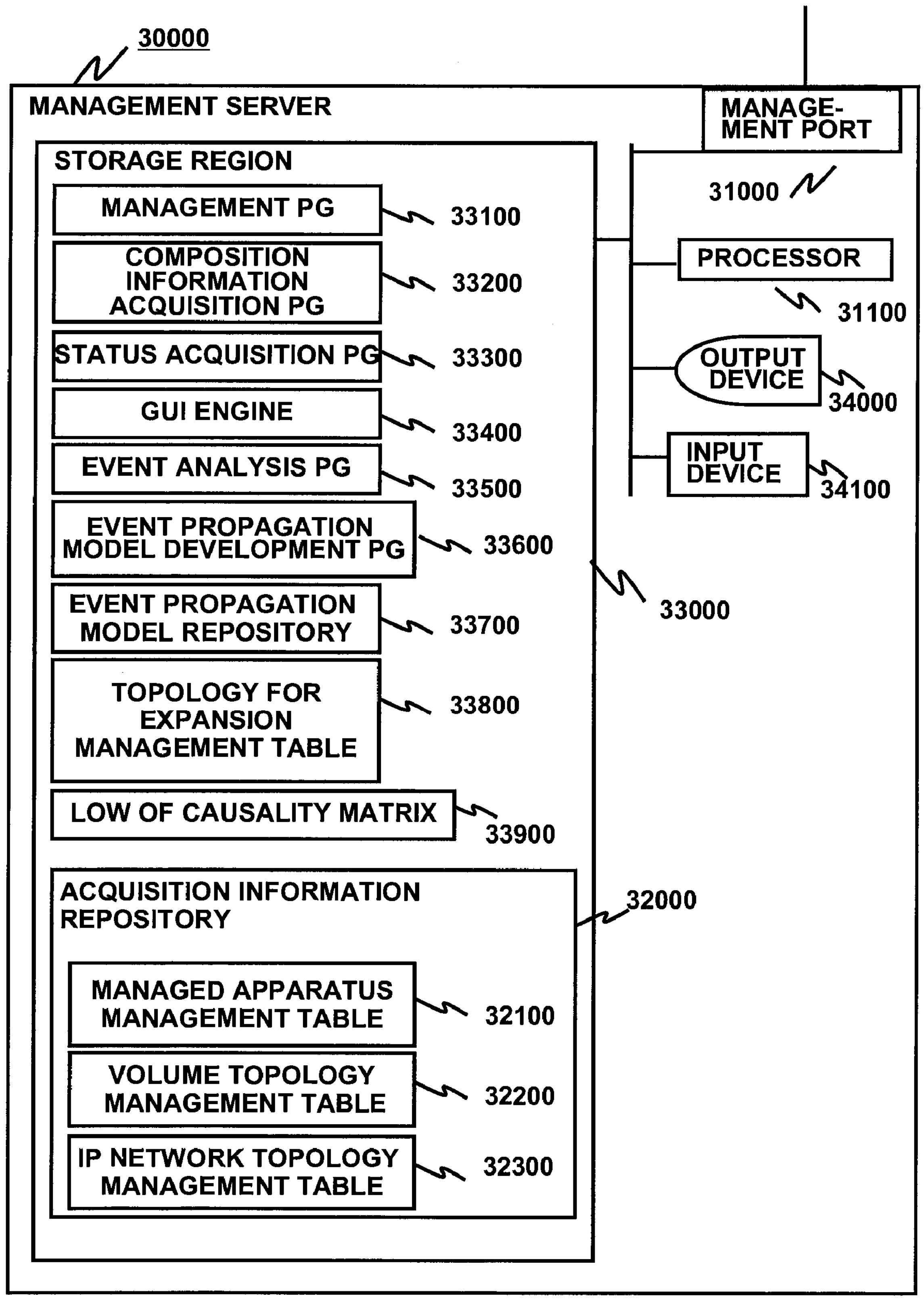
[FIG. 4]

FIG. 4 shows a composition of the management server 30000.

The management server 30000 has a management port 31000, a processor 31100, a storage area 33000, an output device 34000, and an input device 34100, which are all coupled to one another via a circuit, such as an internal bus.

The output device 24000 is, for example, a display device for outputting a processing result described hereinafter (for example, the cause of the occurrence of a failure). The input device 34100 is, for example, a keyboard, a pointing device, or the like used by a manager to input an instruction. The output device and the input device may be integrated. Furthermore, an interface device (for example, a serial interface or an Ethernet interface) may be used as the input/output device of the management server 30000. In this case, the interface device may be coupled to the display computer (a computer having the display device and the input device), so that display information may be transmitted to a display computer, or input information may be received from the display computer.

The storage area 33000 is realized by, for example, a memory and/or a hard disk. The storage area 33000 stores therein a management program 33100, a composition information acquisition program 33200, a status acquisition program 33300, a GUI (Graphical User Interface) engine 33400, an event analysis program 33500, an event propagation model expansion program 33600, an event propagation model repository 33700, an topology for expansion management table 33800, and a low of causality matrix 33900. The storage area 33000 also has an acquired information repository 32000.

A management program 33100 instructs the composition information acquisition program 33200 to acquire composition information from each node apparatus (the storage apparatus 20000, host computer 10000, and IP switches 40000) on a regular basis.

The composition information acquisition program 33200 acquires the composition information from each node apparatus (the storage apparatus 20000, host computer 10000, and IP switches 40000) in response to the instruction from the management program 33100, and stores the acquired composition information in the acquired information repository 32000.

The status acquisition program 33300 acquires information representing an operational status of each node apparatus from the each node apparatus (the storage apparatus 20000, host computer 10000, and IP switches 40000). When there exists operational status information representing a failure of an element within the node apparatus, the status acquisition program 33300 informs the event analysis program 33500 of a failure event. This failure event represents whether a failure is generated in a certain element of a certain node apparatus.

The event analysis program 33500 identifies a root cause of the failure event based on the failure event informed from the status acquisition program 33300 and the low of causality matrix 33900. The event analysis program 33500 informs the manager of the specified root cause by means of the GUI engine 33400 (in other words, a GUI displaying the root cause is displayed by the GUI engine 33400).

A managed apparatus management table 32100, a volume topology management table 32200, and an IP network topology management table 32300 are stored in the acquired information repository 32000.

In response to a request from the manager that is input using the input device 34100, the GUI engine 33400 displays the acquired composition information (and/or at least any one of the information 33700, 33800, 33900, 32100, 32200 and 32300) through the output device 34000.

Hereinafter, a group of one or more computers that mange the computer system and display the display information such as the root cause of the failure event is sometimes called "management system." When the management computer displays the display information, the management computer is the management system. The combination of a management computer and a display computer also constitutes the management system. In order to increase the speed and reliability of management processing, processing equivalent to that of the management computer may be realized using a plurality of computers. In this case, the plurality of computers (including the display computer performs display) are the management system. In this embodiment, the management server 30000 is the management system.

Figure 5:
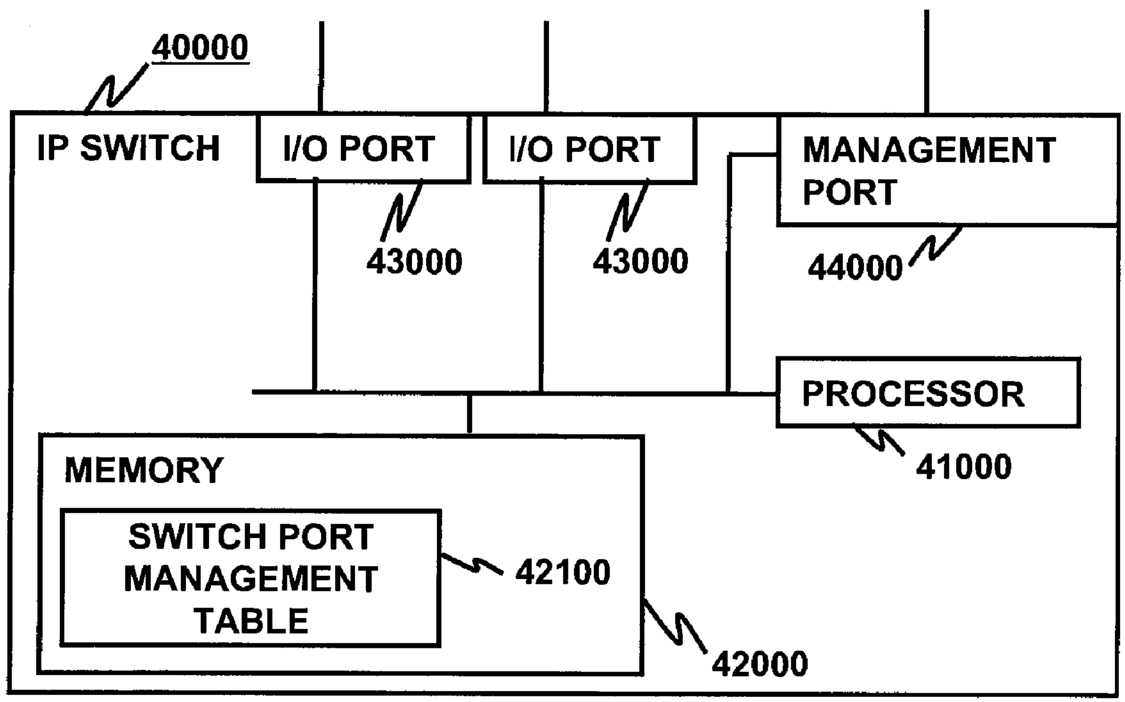
[FIG. 5]

FIG. 5 shows a composition of one of the IP switches 40000.

The IP switch 40000 has a processor 41000, a memory 42000, a plurality of I/O ports 43000, and a management port 44000, which are coupled to one another via a circuit, such as an internal bus. The I/O ports 43000 receive information from either the host computer 10000 or the storage apparatus 20000. The management port 44000 receives information from the management server 30000.

The memory 42000 stores therein a switch port management table 42100. In place of the memory 42000, part of or the entire memory 42000 may be a magnetic disk or other physical storage apparatus.

FIG. 6A shows a composition of the logical drive management table 13300.

The logical drive management table 13300 has the following fields for each logical drive managed by the host computer 10000 having this table 13300:

- a field 13310 having an identifier of a logical drive (drive ID) registered therein;
- a field 13320 having registered therein an identifier of the port 11000 that issues an I/O request based on I/O to/from the logical drive (iSCSI initiator name);
- a field 13330 having registered therein an identifier of the I/O port 21000 that receives the I/O request issued by the port 11000 (connected iSCSI target); and
- a field 13340 having an identifier of the logical volume (LUN (Logical Unit Number)) registered therein.

The table 13300 shown in FIG. 6A is the table 13300 of a first host computer 10000 (to be referred to as "host 1" hereinafter). According to this table 13300, a logical drive "E:" represented by the drive ID is associated with a logical volume having LUN "0," by the port 11000 represented by the iSCSI initiator name "com.aaa.sv1," and the I/O port 21000 represented by the iSCSI target name "com.aaa.sto1."

Note that FIG. 6B shows the logical drive management table 13300 of a second host computer 10000 (to be referred to as "host 2" hereinafter), and FIG. 6C shows the logical drive management table 13300 of a third host computer 10000 (to be referred to as "host 3" hereinafter).

FIG. 7A shows a composition of the iSCSI initiator management table 13400.

The iSCSI initiator management table 13400 has the following fields for each port 11000 within the host computer 10000 having this table 13400:

- a field 13410 having an identifier of the port 11000 (port ID) registered therein;
- a field 13420 having registered therein an identifier of the port 11000 on the network 45000 (MAC (Media Access Control) address); and
- a field 13430 having the iSCSI initiator name of the port 11000 registered therein.

The table 13400 shown in FIG. 7A is the table 13400 of the host 1. According to this table 13400, the MAC address "11:11:11:11:11:11" and the iSCSI initiator name "com.aaa.sv1" are allocated to the port 11000 having the port ID "LAN 1."

Note that FIG. 7B shows the iSCSI initiator management table 13400 of the host 2, and FIG. 7C shows the iSCSI initiator management table 13400 of the host 3.

FIG. 8 shows a composition of the volume management table 23200.

The volume management table 23200 has the following fields for each logical volume of the storage apparatus 20000:

- a field 23210 having an identifier of a logical volume (volume ID) registered therein;
- a field 23220 having the capacity of the logical volume registered therein;
- a field 23230 having registered therein an identifier of an iSCSI target (target ID) to which the logical volume belongs; and
- a field 23240 having registered therein an identifier of the logical volume within the iSCSI target (LUN).
- The volume ID is an ID that is used within the storage apparatus 20000 and is not specified by the host computer 10000. The LUN is an ID that is specified by the host computer 10000.

According to the table 23200 shown in FIG. 8, a logical volume having the volume ID "VOL 1" has a storage capacity of 20 GB (giga byte), belongs to an iSCSI target having the iSCSI target ID "TG1," and has LUN "0" allocated thereto.

FIG. 9 shows a composition of the iSCSI target management table 23300.

The iSCSI target management table 23300 has the following fields for each iSCSI target within the storage apparatus 20000:

- a field 23310 having an identifier of an iSCSI target (target ID) registered therein;
- a field 23320 having an iSCSI target name of the iSCSI target registered therein; and
- a field 23330 having registered therein an identifier of the port 11000 of the host computer 10000 (iSCSI initiator name) that is permitted to access the logical volume belonging to the iSCSI target.

According to the table 23300 shown in FIG. 9, the iSCSI target name "com.aaa.sto1" is allocated to the iSCSI target having the iSCSI target ID "HG1," and access from the port 11000 having the iSCSI initiator name "com.aaa.sv1" or "com.aaa.sv11" is permitted.

FIG. 10 shows a composition of the I/O port management table 23400.

The I/O port management table 23400 has the following fields for each I/O port 21000 of the storage apparatus 20000:

- a field 23410 having an identifier of the I/O port 21000 (port ID) registered therein;
- a field 23420 having registered therein an identifier of the I/O port 21000 on the network 45000 (MAC address); and
- a field 23430 having registered therein an identifier of the iSCSI target (target ID) that uses the I/O port 21000.

According to the table 23400 shown in FIG. 10, the I/O port 21000 having the port ID "PORT1" is allocated with the MAC address "22:22:22:22:22:11," and is used by the iSCSI target having the iSCSI target ID "TG1" or "TG2."

Figure 11A:
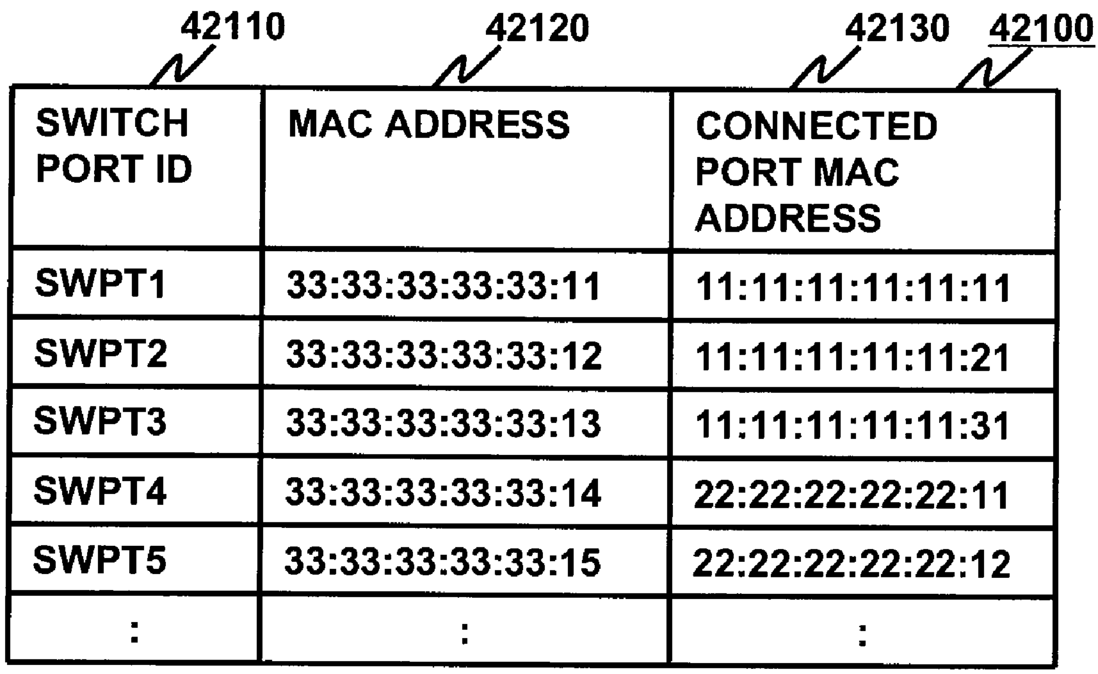
[FIG. 11A]

FIG. 11A shows a composition of the switch port management table 42100.

The I/O port management table 42100 has the following fields for each I/O port 43000 of the IP switch 40000:

- a field 42110 having an identifier of the I/O port 43000 (port ID) registered therein;
- a field 42120 having registered therein an identifier of the I/O port 43000 on the network 45000 (MAC address); and
- a field 42130 having registered therein an identifier of a port of other node apparatus (MAC address) coupled to the I/O port 43000 via the network 45000.

Figure 11B:
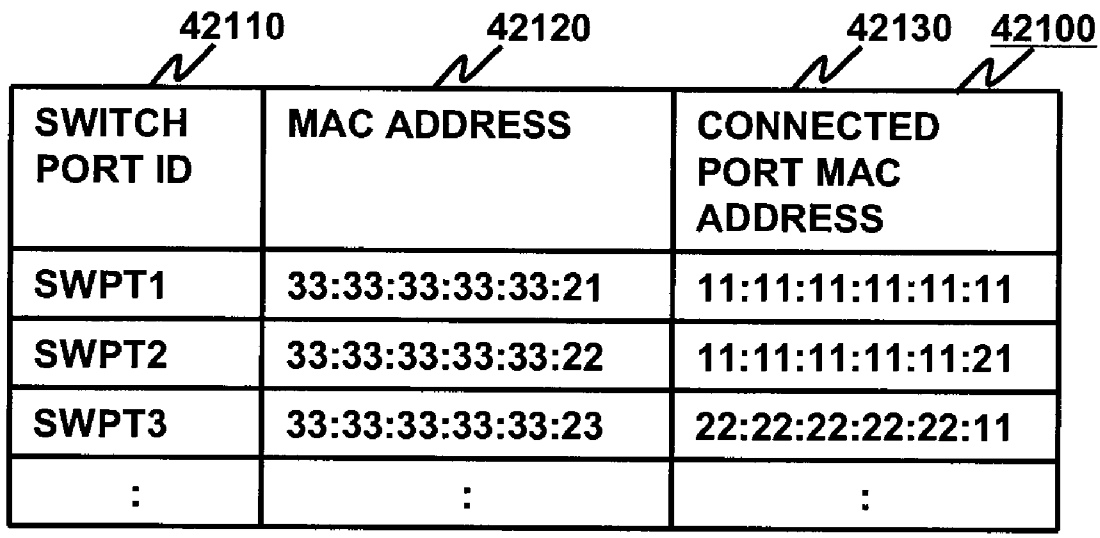
[FIG. 11B]

The table 42100 shown in FIG. 11A is the table 42100 of a first IP switch 40000 (to be referred to as "switch 1" hereinafter). According to the table 42100 shown in FIG. 11A, the I/O port 43000 having the port ID "SWPT 1" is allocated with the MAC address "33:33:33:33:33:11" and coupled to a port of other node apparatus allocated with the MAC address "11:11:11:11:11:11." Note that the table 42100 shown in FIG. 11B is the table 42100 of a second IP switch 40000 (to be referred to as "switch 2" hereinafter).

FIG. 12A shows a composition of the managed apparatus management table 32100.

The managed apparatus management table 32100 has the following fields for each management target node apparatus of the management server 30000:

- a field 32110 having an IP address of a node apparatus registered therein;
- a field 32120 having the type of the node apparatus registered therein;
- a field 32130 having an identifier of the node apparatus (node ID) registered therein;
- a field 32140 having registered therein a user ID that is used by the composition information acquisition program 33200 to access the node apparatus; and
- a field 32150 having registered therein a password that is used along with the user ID by the composition information acquisition program 33200 to access the node apparatus.

According to the table 32100 shown in FIG. 12A, the management server 30000 access the host 1 (a node apparatus having the node ID "HOST 1") having the IP address "192.168.5.5" to acquire the composition information from the host 1, wherein the user ID used here is "user" and the password is "pwd."

Note that the table 32100 shown in FIG. 12B is the table 32100 obtained after updating the table 32100 shown in FIG. 12A. Specifically, the fact that the table 32100 shown in FIG. 12A is changed to the table 32100 shown in FIG. 12B means that the three node apparatuses of the host 3, the IP switch 1 and the IP switch 2 are added newly as the management targets.

FIG. 13A shows a composition of the volume topology management table 32200.

"Volume topology" is a topology related to a logical volume. In other words, it indicates which logical volume 241000 of which storage apparatus 20000 is associated with a certain logical drive of a certain host computer 10000 via a certain I/O port.

The volume topology management table 32200 has the following fields for each logical volume of the storage apparatus 20000:

- a field 32210 having registered therein an identifier of the storage apparatus having a logical volume (system ID);
- a field 32220 having an identifier of the logical volume (volume ID) registered therein;
- a field 32230 having registered therein an identifier (port ID) of the I/O port 21000 associated with the logical volume (the I/O port of the storage apparatus);
- a field 32240 having an identifier of the host computer 10000 (host ID) registered therein;
- a field 32250 having registered therein the drive ID of a logical drive associated with the logical volume; and a field 32260 having registered therein an identifier of the port 11000 of the host computer 10000 (port ID).

According to the table 32200 shown in FIG. 13A, the logical volume "VOL 1" of a storage apparatus "SYS1" is associated with the logical drive "E:" within a host computer via the I/O port "PORT1" of the storage apparatus and the port "LAN 1" of the host computer "HOST 1".

Note that the table 32200 shown in FIG. 13B is the table 32200 obtained after updating the table 32200 shown in FIG. 13A. Specifically, the fact that the table 32200 shown in FIG. 13A is changed to the table 32200 shown in FIG. 13B means that a logical volume "VOL5" of the storage apparatus "SYS1" is added, and that the logical volume "VOL5" is associated with the logical drive "E:" within the host computer "HOST 3" via an I/O port "PORT2" of the storage apparatus and the port "LAN 1" of the host computer.

FIG. 14A shows a composition of the IP network topology management table 32300.

"IP network topology" is a topology in the network 45000. Specifically, it indicates which port of which node is coupled to a certain point of a certain node via which IP switch.

The IP network topology management table 32200 has the following fields for each I/O port 43000 of the IP switch 40000:

a field 32310 having an identifier of the storage apparatus 20000 (system ID) registered therein;

a field 32320 having an identifier of the I/O port 21000 of the storage apparatus 20000 (port ID) registered therein;

a field 32330 having an identifier of the IP switch 40000 (IP switch ID) registered therein;

a field 32340 having an identifier of the I/O port 43000 of the IP switch 40000 (switch port ID) registered therein;

a field 32350 having an identifier of the host computer 10000 (host ID) registered therein; and a field 32360 having an identifier of the port 11000 of the host computer 10000 (port ID) registered therein.

According to the table 32300 shown in FIG. 14A, the I/O port "PORT1" of the storage apparatus "SYS1" is coupled to the port "LAN 1" of the host computer "HOST 1" via the I/O ports "SWPT 1" and "SWPT 4" of the IP switch "SW 1."

Note that the table 32300 shown in FIG. 14B is the table 32300 obtained after updating the table 32300 shown in FIG. 14A. Specifically, the fact that the table 32300 shown in FIG. 14A is changed to the table 32300 shown in FIG. 14B means that a new IP network topology passing through the IP switch "SW 2" and a new IP network topology passing through the I/O ports "SWPT 3" and "SWPT 5" of the IP switch "SW 1" are added.

FIGS. 15A and 15B show a composition of an event propagation model 150 stored in the event propagation model repository 33700.

The event propagation model 150 is information representing a model of an event type and a model of the cause of the occurrence (root cause) of the type of the event. In this model 150, a combination of types of events that are predicted to occur as a result of a certain failure, and a root cause of the events are described in an "IF-THEN" format.

Specifically, for example, the event propagation model 150 has the following field:

a field 33710 having an identifier of an event propagation model (model ID) registered therein;

a field 33720 having registered therein an monitored event (a combination of event types) corresponding to an IF part of the model 150 described in the IF-THEN format; and a field 33730 having registered therein a causal event (root cause) corresponding to a THEN part of the model 150 described in the IF-THEN format.

According to the model 150 shown in FIG. 15A, an event propagation model "Rule 1" means that "when both an error of a logical drive within the host computer and an error of a logical volume within the storage apparatus are detected, the root cause of these errors is a breakdown in the logical volume within the storage apparatus."

As the event types included in the monitored event, normality of a certain type of element within a certain type of node apparatus may be defined. A model "Rule 2" shown in FIG. 15B means that "in the case where an error is generated in a port within the host computer, where the I/O port within the IP switch is normal, and where an error is generated in the I/O port within the storage apparatus, the root cause of these errors is a breakdown in the I/O port within the storage apparatus."

FIG. 19 shows a composition of the topology for expansion management table 33800.

The topology for expansion management table 33800 shows which type of topology management table is used for each combination (data model) of the type of the node apparatus and the type of the element of the node apparatus. This table 33800 also includes a flag indicating whether partial expansion can be performed on the low of causality matrix 33900. Specifically, this table 33800 has the following fields for each data model:

a field 33810 having registered therein the type of a node apparatus and the type of an element of the node apparatus;

a field 33820 having registered therein the name of a topology management table to be applied; and a field 33830 having registered therein a value of a flag indicating whether partial expansion can be performed or not.

According to the table 33800, the event propagation model 150 that has the information on the logical drive of the host computer and on the logical volume and I/O port of the storage apparatus can be expanded by using the volume topology management table 32200. Furthermore, the model 150 can be subjected to partial expansion.

"Expansion of the event propagation model" here means that a sub-line/column according to the model 150 and the topology management table to be applied (a line/column of the line/column 33900 that corresponds to the model 150) is added or deleted with respect to the low of causality matrix 33900.

"Partial expansion of the event propagation model" here means that a line/column section according to the model and the topology management table to be applied (a line or column itself, or information to be added to the line or column) is added or deleted with respect to the line/column within the low of causality matrix 33900 corresponding to the model.

FIG. 16A shows the low of causality matrix 33900.

The low of causality matrix 33900 is a line/column showing the relationship between an event and the root cause of the event. Note that the low of causality matrix is an example of the event cause information. Specifically, the low of causality matrix 33900 has the following fields:

a field 33910 having registered therein an identifier of the event propagation model 150 used in expansion (event propagation model ID);

a field 33920 having an event (monitored event) registered therein;

a field 33930 having the root cause of the event registered therein; and a field 33940 having registered therein the relationship between the event and the root cause.

According to the line/column 33900 shown in FIG. 16A, when the status acquisition program 33200 detects both an error in the logical volume "VOL 1" of the storage apparatus "SYS1" and an error in the logical drive "E:" of the host "HOST 1," the event analysis program 33500 identifies the root cause of these errors as a breakdown in the logical volume "VOL 1" of the storage apparatus "SYS1."

Note that the event cause information may not necessarily have the line/column data structure, and therefore other data structure may be adopted as long as the following conditions are satisfied:

(A) expansion (creation) is performed based on the event propagation model repository and the topology for expansion management table;

(B) the relationship between at least one event in each node apparatus (at least a node apparatus having an event generated therein can be discriminated) and the root cause corresponding to this at least one event (at least the node apparatus having an event generated therein can be discriminated); and (C) A plurality of the relationships described in (B).

A flow of the processing carried out in the present embodiment is described next.

Figure 17:
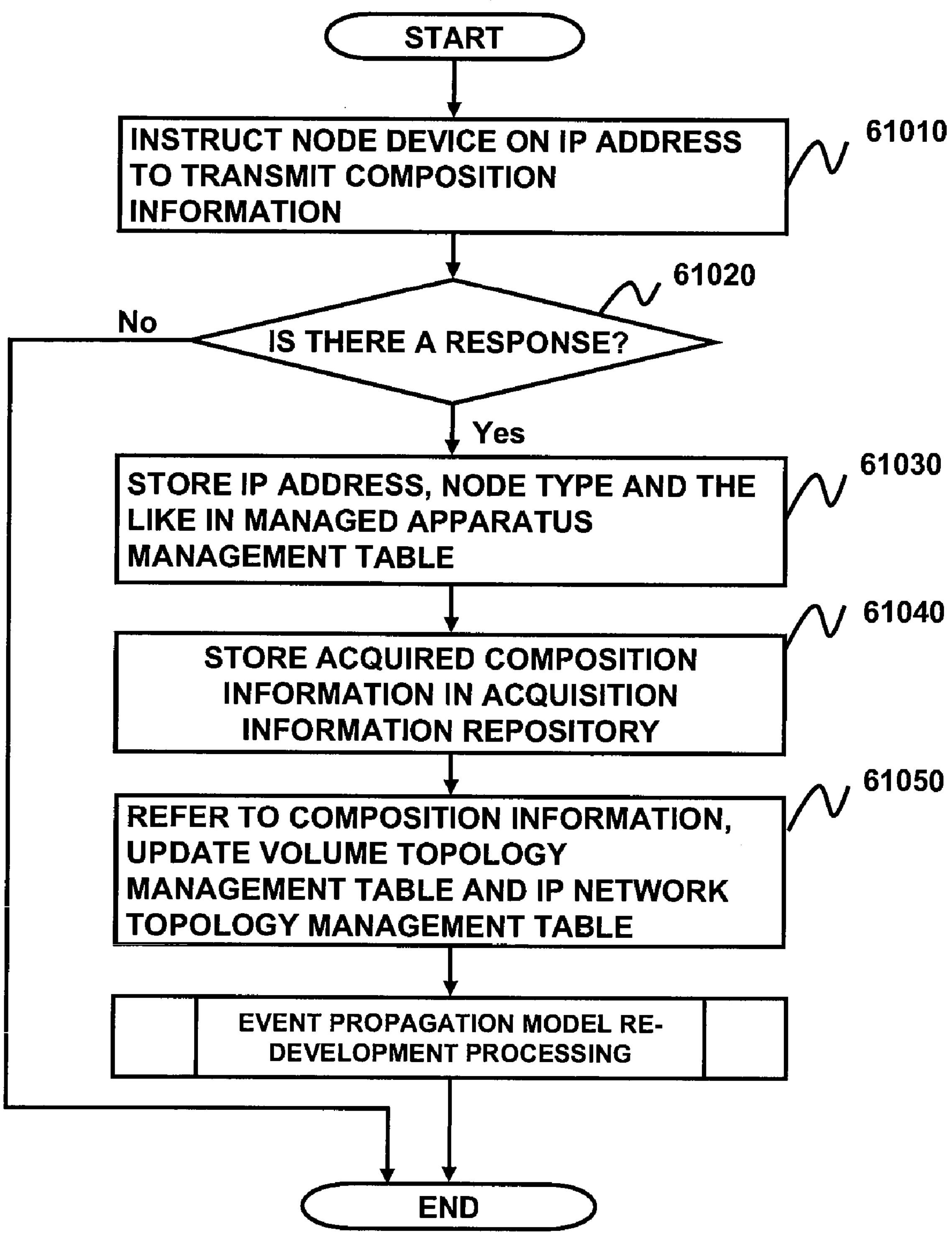
[FIG. 17]

FIG. 17 is a flowchart of managed apparatus addition processing.

The management program 33100 receives the IP address, type, user ID and password of a node apparatus to be added to managed apparatuss, from the manager via the input device 34100, and then instructs the composition information acquisition program 33300 to execute the addition processing shown in FIG. 17.

The program 33200 uses the user ID and password specified by the manager to log into a node apparatus on the IP address specified by the manager, and issues an instruction to transmit the composition information (step 61010).

When there is no response regarding the composition information from the node apparatus that received the instruction (step 61020: NO), this addition processing is ended.

When there is a response regarding the composition information from the node apparatus that received the instruction (step 61020: YES), the program 33200 stores the IP address, type, user ID and pass word of the node apparatus having a response, into the managed apparatus management table 32100 (step 61030).

Furthermore, the program 33200 stores the composition information received from the node apparatus, into the acquired information repository 32000 (step 61040). For example, the tables 13300 and 13400 received from the host computer 10000, the tables 23200, 23300 and 23400 received from the storage apparatus 20000, and the table 42100 received from the IP switch 40000 are stored in the acquired information repository 32000.

The program 33200 refers to the composition information stored in the acquired information repository 32000, and updates the volume topology management table 32200 and/or the IP network topology management table 32300 (step 61050). In other words, the program 33200 reflects the composition information in the topology management table 32200 and/or 32300.

The following is the procedure for updating the volume topology management table 32200:

(S1) the program 33200 refers to the volume management table 23200 stored in the acquired information repository 32000, and detects the iSCSI target name of an iSCSI target to which a certain logical volume (to be referred to as "target volume" hereinafter in this paragraph) is coupled, and the iSCSI initiator name that can access the logical volume;

(S2) the program 33200 refers to the logical drive management table 13300 stored in the acquired information repository 32000;

(S3) the program 33200 searches, from the table 13300, for a record (field group) that has the detected iSCSI target name and iSCSI initiator name, and a LUN same as the LUN of the target volume; and (S4) when the record is found in (S3), the program 33200 registers, into the volume topology management table 32200, the information on the target volume and the information on the logical drive corresponding to the discovered record.

On the other hand, the following is the procedure for updating the IP network topology management table 32300:

(S11) the program 33200 refers to the volume topology management table 32200 stored in the acquired information repository 32000, and detects a certain pair of a port ID of the storage apparatus and a port ID of the host computer (this pair is referred to as "target pair" hereinafter in this paragraph, and in this target pair the port ID of an I/O port of the storage apparatus is called "storage port ID," and the port ID of a port of the host computer is called "host port ID.");

(S12) the program 33200 refers to the I/O port management table 23400 stored in the acquired information repository 32000, and detects the MAC address corresponding to the storage port ID of the target pair (to be referred to as "storage MAC address" hereinafter);

(S13) the program 33200 refers to the iSCSI initiator management table 13400 stored in the acquired information repository 32000, and detects the MAC address corresponding to the host port ID of the target pair (to be referred to as "host MAC address" hereinafter);

(S14) the program 33200 refers to the switch port management table 42100 stored in the acquired information repository 32000, to search for a record (field group) having registered therein both the detected storage MAC address and the detected host MAC address; and (S15) when the record is found, the program 33200 registers, into the IP network topology management table 32300, the switch port ID of the record, the storage port ID and host port ID of the target pair, and information acquired using these IDs as keys.

After the processing described above is finished, the program 33200 instructs the event propagation model expansion program 33600 to carry out event propagation model re-expansion processing (to be referred to as "model re-expansion processing" hereinafter).

The above is the explanation of the managed apparatus addition processing.

Note that the manager can use the input device 34100 to identify the ID of a node apparatus that the manager wishes to remove from the monitoring target node apparatuses. In this case, the management program 33100 deletes the information on the relevant node apparatus from the managed apparatus management table 32100, and further deletes the configuration acquired from the node apparatus, from the acquired information repository 32000. Moreover, out of the topologies stored in the volume topology management table 32200 and the IP network topology management table 32300, a topology having a node to be deleted is deleted. Upon completion of the processing described above, the composition information acquisition program 33200 instructs the event propagation model expansion program 33600 to carry out re-expansion processing.

Figure 18:
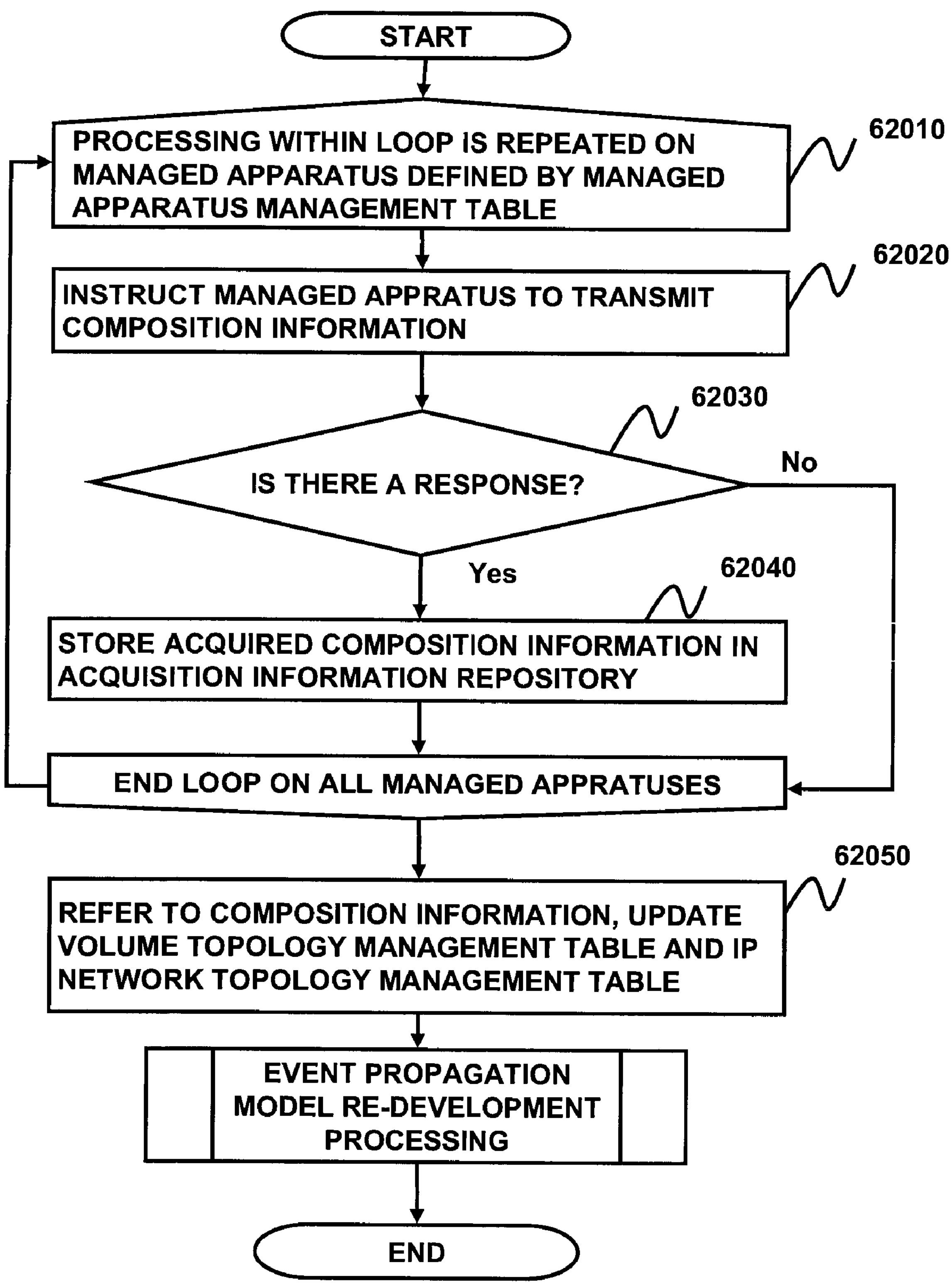
[FIG. 18]

FIG. 18 is a flowchart of composition information acquisition processing.

The management program 33100 instructs the composition information acquisition program 33200 to execute composition information acquisition processing, when the management program 33100 is activated or each time when a fixed time period elapses since the previous composition information acquisition processing. Note that in the case in which the instruction of execution is issued repeatedly, it does not have to be issued every fixed time period strictly, and therefore the issuance may be simply repeated.

In response to the instruction, the composition information acquisition program 33200 repeatedly performs a series of processes described hereinafter, on each monitoring target node apparatus defined in the managed apparatus management table 32100 (step 62010).

The program 33200 uses the user ID and password defined in the managed apparatus management table 32100 to log into the node apparatus defined by this table 32100, and instructs the node apparatus to transmit the composition information (step 62020).

When there is a response regarding the composition information from the node apparatus that received the instruction (step 62030: YES), the program 33200 stores the acquired composition information into the acquired information repository 32000 (step 62040). When there is no response regarding the composition information from the node apparatus that received the instruction, the composition information acquisition processing is ended.

Upon completion of the above processing on all of the monitoring target node apparatuses defined in the managed apparatus management table 32100, the program 33200 refers to the composition information stored in the acquired information repository 32000, and updates the volume topology management table 32200 and the IP network topology management table 32300 (step 62050).

Upon completion of the processing described above, the program 33200 instructs the event propagation model expansion program 33600 to carry out model re-expansion processing shown in FIG. 20.

The above is the explanation of the composition information acquisition processing.

FIG. 20 is a flowchart of model re-expansion processing performed when a node apparatus is added. This processing is carried out when the event propagation model expansion program 33600 receives an instruction regarding model re-expansion processing from the composition information acquisition program 33200 in the addition processing shown in FIG. 17, for example. The model re-expansion processing may be performed by an instruction from the manager.

The event propagation model expansion program 33600 refers to the acquired information repository 32000, and adds, to the monitored event field 33920 of the low of causality matrix 33900, an even that might be received from the node apparatus added to the monitoring target node apparatuses (step 64010).

Next, the program 33600 repeatedly performs a series of processes described above, on all of the event propagation models 150 defined in the event propagation model repository 33700 (step 64020).

The program 33600 refers to the topology for expansion management table 33800, and acquire the name of the topology management table corresponding to the event propagation model 150, from the acquired information repository 32000. The program 33600 then refers to the topology for expansion management table 33800 to check whether partial expansion can be performed on the event propagation model 150 (step 64030).

When partial expansion can be performed on the event propagation model 150 (step 64040), the program 33600 refers to the topology management table 32200 or 32300 having the acquired name, to search for a topology having the node apparatus added to the monitoring target node apparatuses, out of the topologies corresponding to the model 150 (step 64050).

When the relevant topology is found (step 64060: YES), the program 33600 partially expands the event propagation model 150 to the low of causality matrix 33900 on the basis of the acquired topology (step 64070).

On the other hand, when partial expansion cannot be performed on the event propagation model, the program 33600 executes whole re-expansion processing shown in FIG. 21, on this model (to be referred to as "target model" hereinafter in the description of FIG. 21).

The above is the explanation of the model re-expansion processing performed when the node apparatus is added.

Figure 21:
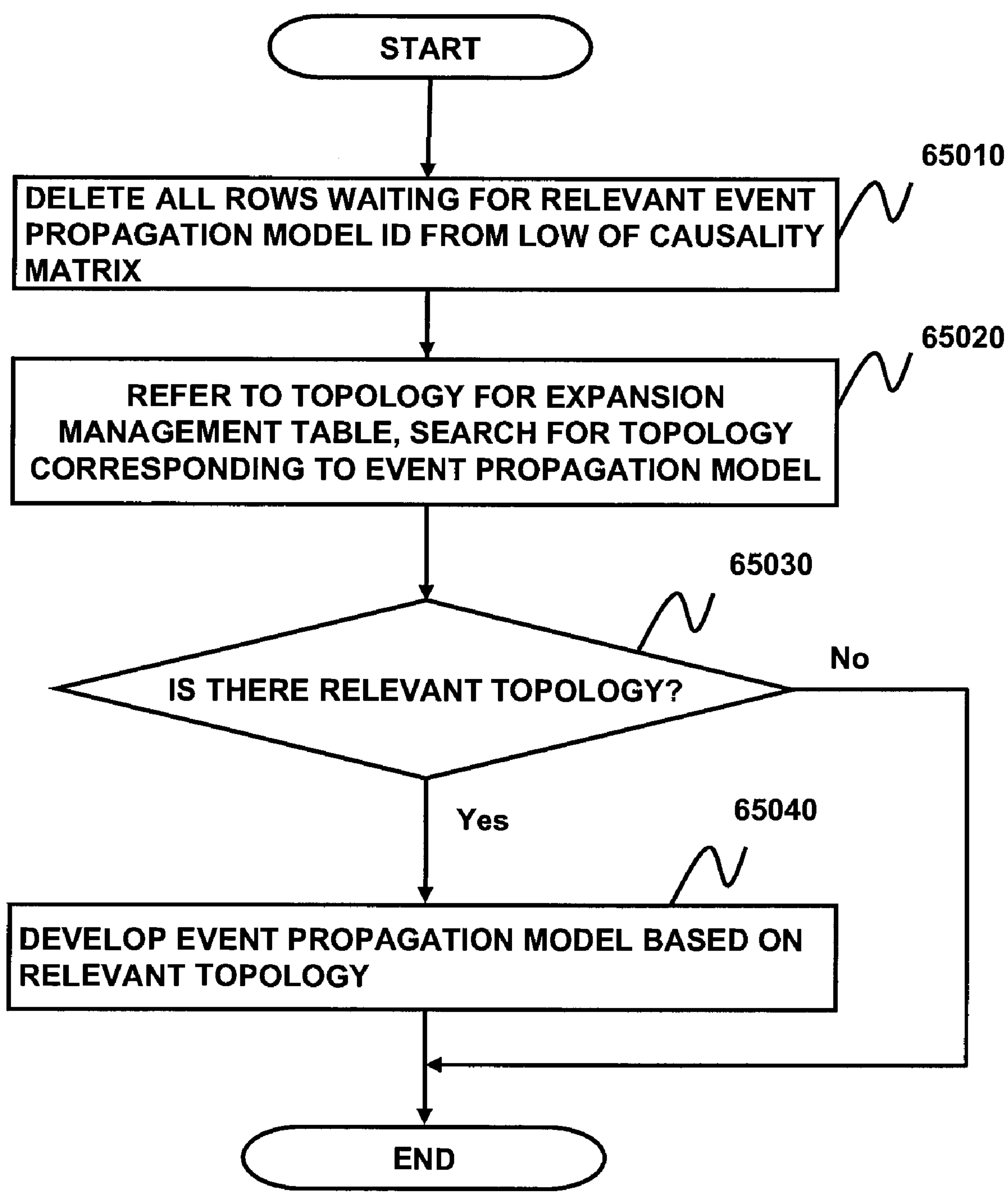
[FIG. 21]

FIG. 21 is a flowchart of the whole re-expansion processing.

The event propagation model expansion program 33600 deletes, from the low of causality matrix 33900, all of the columns that have the ID of the target model in the field 33910 (step 65010).

The program 33600 then refers to the topology for expansion management table 33800, identifies the topology management table corresponding to the target model, and searches for the topology related to the target model (the topology related to the element within the node apparatus defined in the target model), from the identified topology management table 32200 or 32300 (step 65020).

When the relevant topology is found (step 65030: YES), the program 33600 expands the target model to the low of causality matrix 33900 (adds a raw related to the target model, to the line/column 33900) (step 65040).

The above is the explanation of the whole re-expansion processing.

A specific example of the model re-expansion processing performed when a node apparatus is added is described hereinafter. Note that when the model re-expansion processing is started, the managed apparatus management table 32100 is the table 32100 shown in FIG. 12A, the volume topology management table 32200 the table 32200 shown in FIG. 13A, the IP network topology management table 32300 the table 32300 shown in FIG. 14A, the low of causality matrix 33900 related to the event propagation model "Rule 1" the line/column 33900 shown in FIG. 16A, and the low of causality matrix 33900 related to the event propagation model "Rule 2" the line/column 33900 shown in FIG. 16C.

Suppose that the IP addresses, user IDs and passwords of the host computer "HOST 3" and the IP switch "SW 2" are specified by the manager. The composition information acquisition program 33200 logs into a node apparatus on the IP address specified by the manager (the host computer "HOST 3" and the IP switch "SW 2"), and instructs this logged in node apparatus to transmit the composition information. Thereafter, the processing shown in FIG. 18 is performed, whereby the node IDs, IP addresses, user IDs and passwords of the host computer "HOST 3" and the IP switch "SW 2" are stored in the managed apparatus management table 32100. The updated table 32100 is shown in FIG. 12B. Furthermore, the composition information acquisition program 33200 stores the acquired composition information in the acquired information repository 32000, and updates the topology management tables 23300 and 23400 based on the composition information. The updated volume topology management table 23300 is shown in FIG. 13B, and the updated IP network topology management table 23400 is shown in FIG. 14B.

Subsequently, the program 33200 instructs the event propagation model expansion program 33600 to carry out the model re-expansion processing. In this manner, the processing shown in FIG. 20 is carried out.

For example, in the event propagation model "Rule 1" shown in FIG. 15A, "an error of a logical drive of the host computer" and "an error of a logical volume of the storage apparatus" are defined as the monitored events. According to the topology for expansion management table 33800 shown in FIG. 19, the data model having both the logical drive of the host computer and the logical volume of the storage apparatus corresponds to the volume topology management table 32200. In addition, it is defined that partial expansion can be performed on the volume topology management table 32200.

Thus, out of the topologies corresponding to the event propagation model, a topology having the node apparatus added to the monitoring target node apparatuses is specified by the program 33600 using the volume topology management table. The program 33600 adds an event propagation model to the low of causality matrix 33900 based on the specified topology.

Through the processing described above, the low of causality matrix 33900 related to the event propagation model "Rule 1" is updated. In other words, the line/column 33900 is updated from the line/column 33900 shown in FIG. 16A to the line/column 33900 shown in FIG. 16B. Specifically, when a topology that has the logical drive "E:" within the host computer "HOST 3" and the logical volume "VOL 5" within the storage apparatus "SYS 1" is constructed, a line corresponding to the error of the logical drive "E:" within the host computer "HOST 3" is added to the line/column 33900 as the monitored event (event), and a column corresponding to the root cause of this error (breakdown in the logical volume "VOL 5") is added. Then, in accordance with the event propagation model "Rule 1," effective information is configured in intersecting sections 101 and 102 between the added column and the line corresponding to the monitored event, which is the root cause corresponding to this column (for example, a bit is established). As a result, when both the error of the logical drive "E:" within the host computer "HOST 3" and the error of the logical volume "VOl 5" within the storage apparatus "SYS1" are detected, the breakdown in the logical volume "VOL 5" is identified as the root cause.

On the other hand, in the event propagation model "Rule 2" shown in FIG. 15B, "an error of a port of the host computer," "normality of a port of the IP switch," and "an error of an I/O port of the storage apparatus" are defined as the monitored events. According to the topology for expansion management table 33800 shown in FIG. 19, the IP network topology management table 32300 corresponds to a data model having the port of the host computer, the port of the IP switch, and the I/O port of the storage apparatus. Furthermore, whether partial expansion can be performed or not is defined in the volume topology management table 32300.

In this case, the whole re-expansion processing is carried out on the event propagation model "Rule 2." Specifically, all of the columns having the event propagation model ID "Rule 2" are deleted from the line/column 33900. Then, a topology corresponding to the event propagation model "Rule 2" is identified based on the IP network topology management table 32300, and the event propagation model "Rule 2" is expanded to the low of causality matrix 33900 based on the identified topology.

Through the processing described above, the low of causality matrix 33900 related to the event propagation model "Rule 2" is updated from the line/column 33900 shown in FIG. 16C to the line/column 33900 shown in FIG. 17D.

According to Embodiment 1, when a node apparatus is added, it is determined whether partial expansion can be performed or not on the event propagation model related to this node apparatus. When it is determined that partial expansion can be performed, information is added partially to the low of causality matrix related to the event propagation model, whereby the low of causality matrix is completed. In other words, not entire low of causality matrix related to this event propagation model is recreated. As a result, it becomes possible to reduce the burden on the model re-expansion processing performed when a node apparatus is added.

Note that a partial expansion availability flag may be configured I the topology for expansion management table 33800 manually by the manager, or can be configured automatically based on the topology management tables 32200 and 32300. Specifically, when, for example, the added, removed or changed node apparatus is identified as the host apparatus on the basis of the topology management tables 32200 and 32300, the processor configures a value indicating that partial change can be performed, as the partial expansion availability flag. On the other hand, when, for example, the added, removed or changed node apparatus is identified as the storage apparatus on the basis of the topology management tables 32200 and 32300, the processor configures a value indicating that partial change is impossible, as the partial expansion availability flag.

[Mode for the Invention 2]

Embodiment 2 of the present invention will be described next. At this moment, mainly the differences with Embodiment 1 are described, and therefore the explanation of the similarities between Embodiment 1 and Embodiment 2 will be omitted or simplified.

In Embodiment 2, a node apparatus is removed from the monitoring target node apparatuses. When removing a node apparatus to be monitored, the manager uses the input device 34100 to specify the ID of the node apparatus that the manager wishes to remove from the monitoring target node apparatuses. In this case, the management program 33100 deletes the information on the node apparatus to be removed, from the managed apparatus management table 32100, and deletes the composition information acquired from this node apparatus, from the acquired information repository 32000. Furthermore, out of the topologies shown in the volume topology management table 32200 and the IP network topology management table 32300, the topology related to the node apparatus to be removed is [deleted] by the composition information acquisition program 33200.

Upon completion of the processing described above, the composition information acquisition program 33200 instructs the event propagation model expansion program 33600 to execute the model re-expansion processing.

Figure 22:
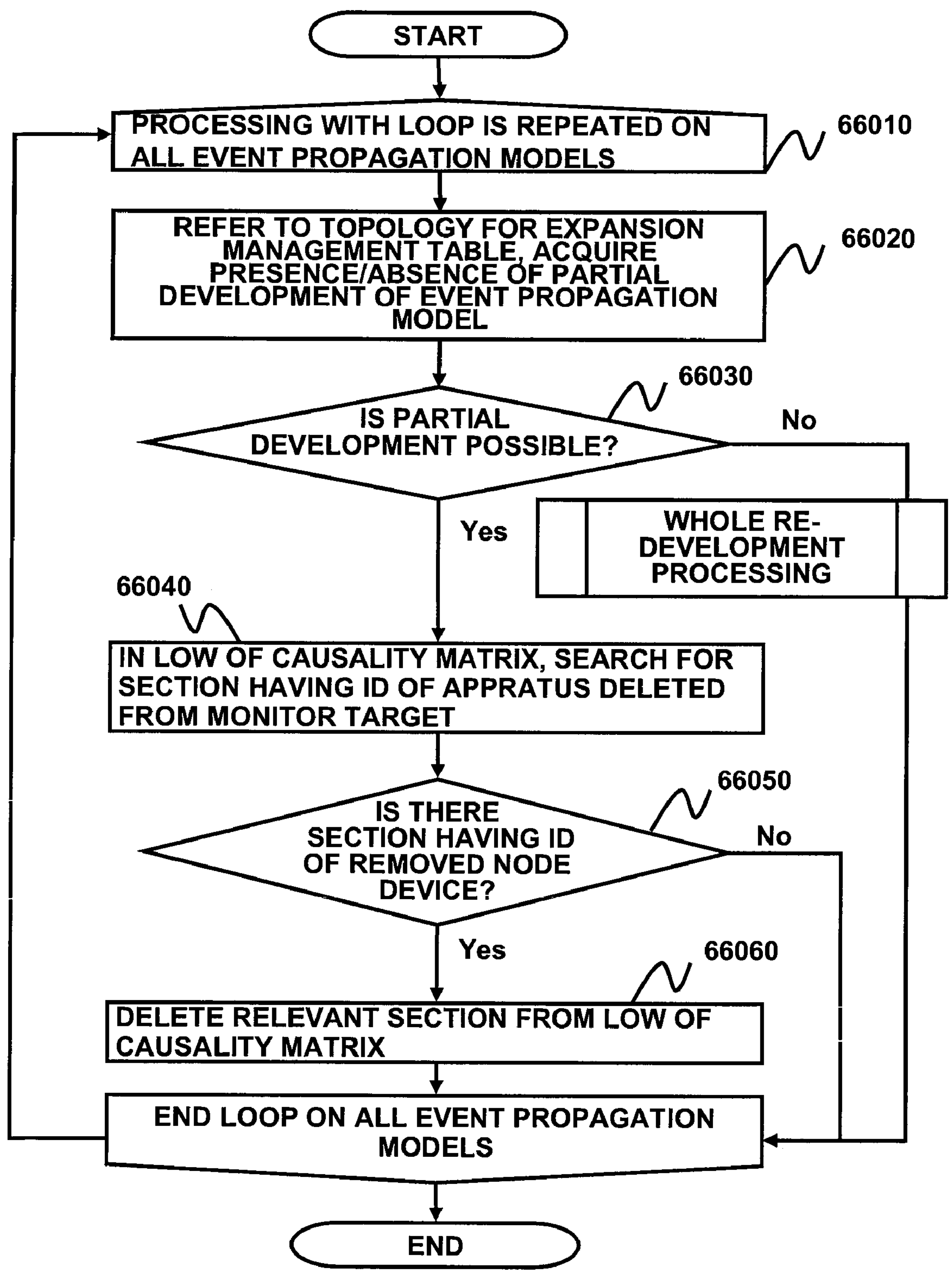
[FIG. 22]

FIG. 22 is a flowchart of the model re-expansion processing performed when a node apparatus is removed.

The event propagation model expansion program 33600 repeatedly performs a series of processes described hereinafter, on all of the event propagation models 150 defined in the event propagation model repository 33700 (step 66010).

The program 33600 refers to the topology for expansion management table 33800, and acquires the name of the topology management table corresponding to an event propagation model, from the acquired information repository 32000. The program 33600 then refers to the topology for expansion management table 33800 to determine whether partial expansion can be performed or not on the event propagation model (step 66020).

When partial expansion cannot be performed on the event propagation model (step 66030: NO), the program 33600 executes the whole re-expansion processing shown in FIG. 21.

When partial expansion can be performed on the event propagation model (step 66030: YES), the program 33600 searches for, in the low of causality matrix 33900, a column that has the ID of the node apparatus removed from the monitoring target node apparatuses, in either the monitored event or the cause (step 66040). When the relevant column is found in the low of causality matrix 33900 (step 66050: YES), the program 33600 deletes the relevant section from the low of causality matrix 33900 (step 66060).

The above is the explanation of the model re-expansion processing performed when a node apparatus is removed.

Hereinafter, a specific example of the model re-expansion processing described. When the model re-expansion processing is started, the managed apparatus management table 32100 is the table 32100 shown in FIG. 12B, the volume topology management table 32200 the table 32200 shown in FIG. 13B, the IP network topology management table 32300 the table 32300 shown in FIG. 14B, the low of causality matrix 33900 related to the event propagation model "Rule 1" the line/column 33900 shown in FIG. 16B, and the low of causality matrix 33900 related to the event propagation model "Rule 2" the line/column 33900 shown in FIG. 16D.

Once an input of the ID of the node apparatus that the manager wishes to remove from the monitoring target node apparatuses is received from the manager, the management program 33100 instructs the composition information acquisition program 33200 to execute managed apparatus deletion processing. A case in which the IDs of the host computer "HOST 3" and the IP switch "SW 2" are specified is described herein.

The composition information acquisition program 33200 deletes the node IDs, IP addresses, user IDs and passwords of the host computer "HOST 3" and the IP switch "SW 2" from the managed apparatus management table 32100. Further, the program 33200 deletes the composition information of the host computer "HOST 3" and the IP switch "SW 2" from the acquired information repository 32000. The managed apparatus management table 32100 obtained after deletion is shown in FIG. 12A.

Moreover, out of the topologies stored in the acquired information repository 32000, the topology having the node apparatus to be removed is deleted by the program 33200. The volume topology management table 32200 obtained after deleting the topology is shown in FIG. 13A, and the IP network topology management table 32300 obtained after the topology is deleted is shown in FIG. 14A.

Upon completion of the processing described above, the program 32200 instructs the event propagation model expansion program 33600 to carry out the model re-expansion processing. Consequently, the processing shown in FIG. 22 is carried out.

For example, in the event propagation model "Rule 1" shown in FIG. 15A, "an error of a logical drive of the host computer" and "an error of a logical volume of the storage apparatus" are defined as the monitored events. According to the topology for expansion management table 33800 shown in FIG. 19, the volume topology management table 32200 corresponds to a data model that has both the logical drive of the host computer and the logical volume of the storage apparatus. Furthermore, it is defined that partial expansion can be performed on the table 32200.

Then, each column of the low of causality matrix is referred to, and a column that has the node apparatus removed from the monitoring target node apparatuses is deleted from the low of causality matrix 33900. Through the processing described above, the low of causality matrix 33900 related to the event propagation model "Rule 1" is updated from the line/column 33900 shown in FIG. 17B to the line/column 33900 shown in FIG. 17A.

On the other hand, in the event propagation model "Rule 2" shown in FIG. 15B, "an error of a port of the host computer," "normality of an I/O port of the IP switch," and "an error of a port of the storage apparatus" are defined as the monitored events. According to the topology for expansion management table 33800 shown in FIG. 19, the IP network topology management table 32300 corresponds to a data model that has the port of the host computer, the I/O port of the IP switch, and the I/O port of the storage apparatus. Furthermore, it is defined partial expansion cannot be performed or not on the table 33800.

Thus, the program 32200 deletes all of the column corresponding to the event propagation model ID "Rule 2" from the low of causality matrix 33900. The program 32200 then refers to the IP network topology management table 32300, and acquires the topology corresponding to the event propagation model "Rule 2." The program 32200 expands the event propagation model "Rule 2" to the low of causality matrix 33900 on the basis of the acquired topology. Through the processing described above, the low of causality matrix 33900 related to the event propagation model "Rule 2" is updated from the line/column 33900 shown in FIG. 17D to the line/column 33900 shown in FIG. 17C.

As described above, according to Embodiment 2, when the node apparatus is removed, it is determined whether or not partial expansion (partial deletion) can be performed on the event propagation model related to this node apparatus. When it is determined that partial expansion can be performed, only the information section related to this event propagation model is deleted from the low of causality matrix, whereby the low of causality matrix is completed after removing the node apparatus. as a result, it becomes possible to reduce the burden on the model re-expansion processing performed when a node apparatus is removed.

[Mode for the Invention 3]

According to Embodiment 3, during the composition information acquisition processing shown in FIG. 18, the composition information acquisition program 33200 instructs the event propagation model expansion program 33600 to carry out the model re-expansion processing. However, the model re-expansion processing may be performed by an instruction from the manager.

Figure 23:
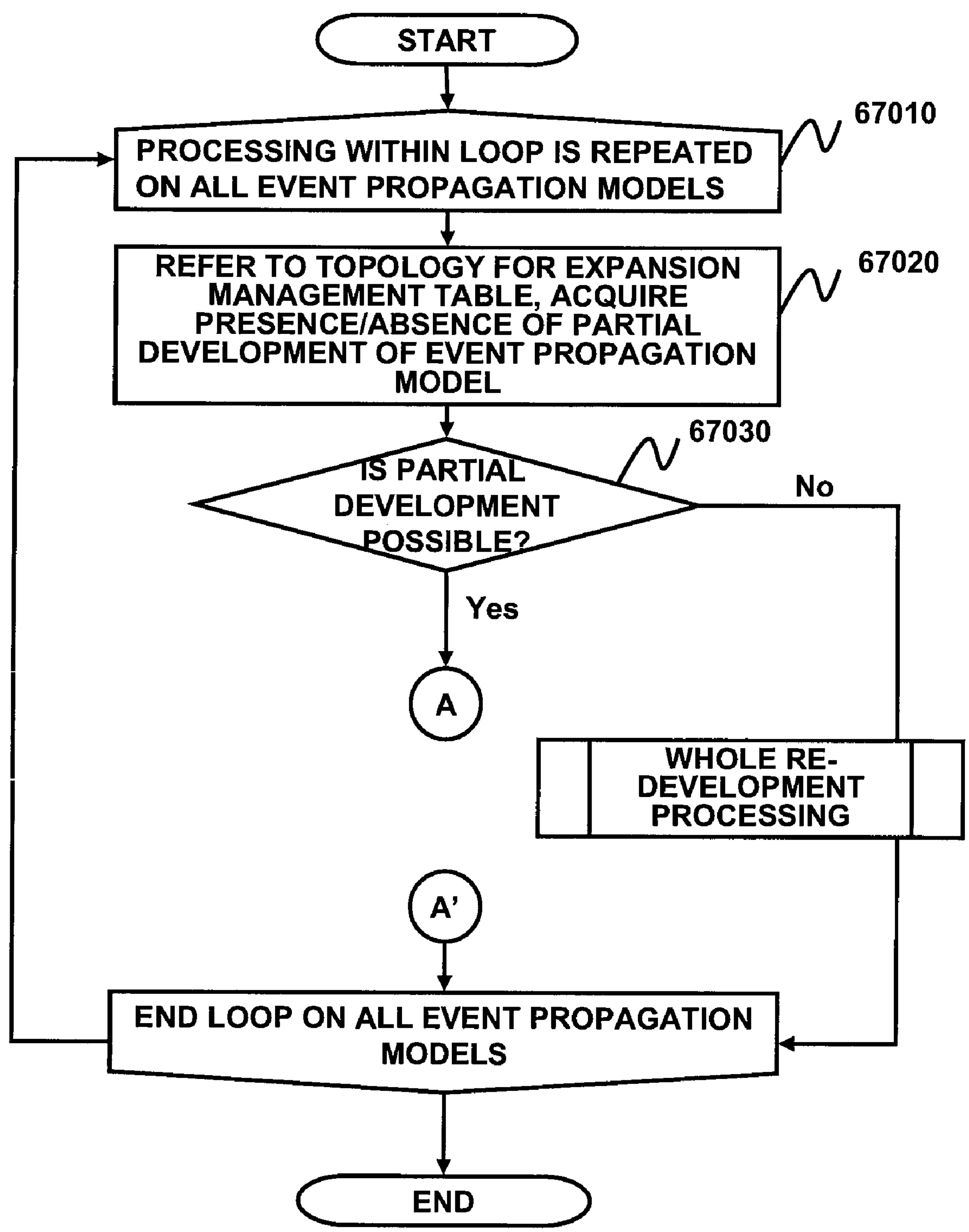
[FIG. 23]
Figure 24:
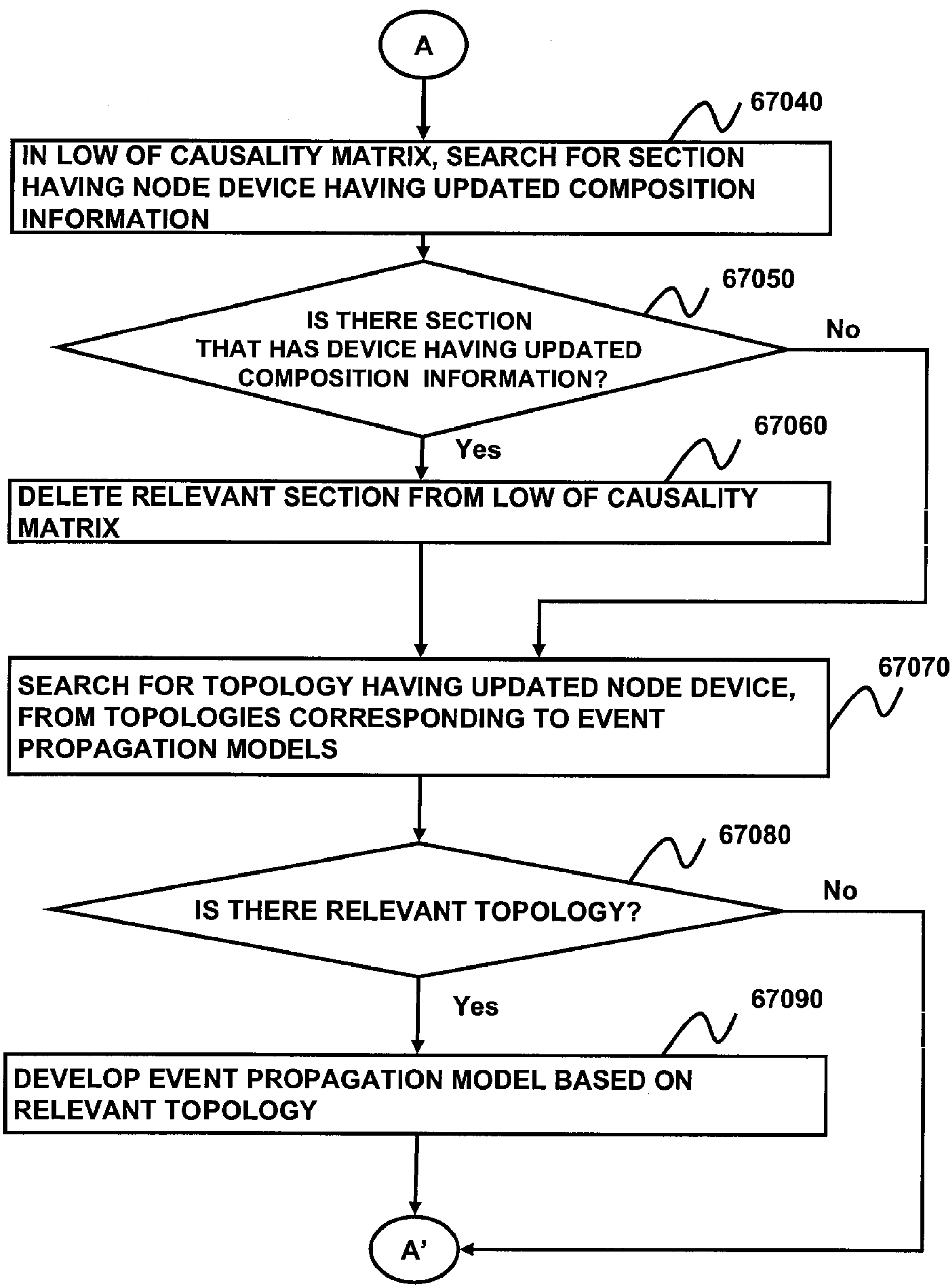
[FIG. 24]

FIGS. 23 and 24 are flowcharts showing the model re-expansion processing performed when the composition information is acquired.

The event propagation model expansion program 33600 repeatedly performs a series of processes described hereinafter, on all of the event propagation models defined in the event propagation model repository 33700 (step 67010).

The program 33600 refers to the topology for expansion management table 33800, and acquires the name of the topology management table corresponding to an event propagation model, from the acquired information repository 32000. The program 33600 then checks whether or not partial expansion can be performed on the event propagation model (step 67020).

When partial expansion can be performed on the event propagation model repository (step 67030: YES), the program 33600 searches, in the low of causality matrix 33900, for a column that has the ID of a node apparatus having the changed composition information in either the monitored event or the cause (step 67040). When the relevant column is found in the low of causality matrix 33090 (step 67050: YES), the program 33600 deletes the relevant column from the low of causality matrix 33900 (step 67060).

Next, the program 33600 searches, from the acquired information repository 32000, for the topology having the changed node apparatus out of the topologies corresponding to the event propagation model (step 67070). When the relevant topology exists (step 67080: YES), the program 33600 expands the event propagation model to the low of causality matrix 33900 on the basis of the acquired topology (step 67090).

On the other hand, when partial expansion cannot be performed on the event propagation model, the whole re-expansion processing shown in FIG. 21 is executed.

The above is the explanation of the model re-expansion processing performed when acquiring the composition information.

According to Embodiment 3, when the composition information is acquired, it is determined whether or not partial expansion can be performed on the event propagation model related to the node apparatus having the changed composition information. When it is determined that partial expansion can be performed, only the information section related to this event propagation model is deleted, and thereafter information is added partially to the low of causality matrix related to this event propagation model. Consequently, it becomes possible to reduce the burden on the model re-expansion processing performed when the composition information is changed.

Although the above has described several suitable embodiments of the present invention, these embodiments are merely examples for illustrating the present invention and therefore do not limit the scope of the present invention thereto. The present invention can be implemented in various other embodiments. For example, the switches composing the network are not limited to the IP switches, and therefore other types of switches may be employed.

The invention claimed is:

1. A computer coupled to a plurality of node apparatuses, comprising:

a storage resource storing event cause information representing event relationships between events and causes of the events, wherein each of the events indicates a status of an element in a node apparatus; and a processor which identifies the cause of the event on the basis of the event cause information when the event is detected, wherein the event cause information is created based on a plurality of event cause models stored in the storage resource and topology information stored in the storage resource, wherein the topology information represents element relations between elements in the node apparatuses, wherein each of the event cause models represents a combination of event types for identification of the cause of the combination of event types, and each of the event types represents a type of event can be occurred in the node apparatuses, and wherein the processor is configured to:

(A) identify a certain node apparatus which is changed, by receiving composition information from the node apparatuses;

(B) delete a part of the event cause information which is related to the certain node apparatus; and (C) re-create a part of the event cause information which is related to the certain node apparatus, based on one or more of the event cause models related to the certain node apparatus and a part of the topology information which is related to the certain node apparatus.

2. A non-transitory computer readable medium that stores a computer program that is executed by a computer coupled to a plurality of node apparatuses, the computer program causing the computer to execute:

(A) storing, in a storage resource, event cause information representing event relationships between events and causes of the events, wherein each of the events indicates a status of an element in a node apparatus;

(B) identifying, by the computer, the cause of the event on the basis of the event cause information when the event is detected;

wherein the event cause information is created based on a plurality of event cause models stored in the storage resource and topology information stored in the storage resource, wherein the topology information represents element relations between elements in the node apparatuses, wherein each of the event cause models represents a combination of event types for identification of the cause of the combination of event types, and each of the event types represents a type of event can be occurred in the node apparatuses;

(C) identifying, by the computer, a certain node apparatus which is changed, by receiving composition information from the node apparatuses;

(D) deleting, by the computer, a part of the event cause information which is related to the certain node apparatus; and (E) re-creating, by the computer, a part of the event cause information which is related to the certain node apparatus, based on one or more of the event cause models related to the certain node apparatus and a part of the topology information which is related to the certain node apparatus.

3. An event cause information updating method that is realized by a computer system having a plurality of node apparatuses, the method comprising:

(A) storing, in a storage resource, event cause information representing event relationships between events and causes of the events, wherein each of the events indicates a status of an element in a node apparatus;

(B) identifying, by the computer system, the cause of the event on the basis of the event cause information when the event is detected;

wherein the event cause information is created based on a plurality of event cause models stored in the storage resource and topology information stored in the storage resource, wherein the topology information represents element relations between elements in the node apparatuses, wherein each of the event cause models represents a combination of event types for identification of the cause of the combination of event types, and each of the event types represents a type of event can be occurred in the node apparatuses;

(C) identifying, by the computer system, a certain node apparatus which is changed, by receiving composition information from the node apparatuses;

(D) deleting, by the computer system, a part of the event cause information which is related to the certain node apparatus; and (E) re-creating, by the computer system, a part of the event cause information which is related to the certain node apparatus, based on one or more of the event cause models related to the certain node apparatus and a part of the topology information which is related to the certain node apparatus.

4. A computer according to claim 1, wherein the storage resource further stores control information indicating whether the execution of (A) through (C) regarding a certain type of node apparatuses is enabled or disabled.

5. A computer according to claim 1, wherein the computer is configured to:

(D) identify a second certain node apparatus which is added, by receiving composition information from the node apparatuses; and (E) create a second part of the event cause information which is related to the second certain node apparatus, based on one or more of the event cause models related to the certain node apparatus and a new element relations related to the second certain node apparatus.

6. A computer according to claim 1, wherein the computer is configured to:

(E) identify a third certain node apparatus which is deleted; and (F) delete a second part of the event cause information which is related to the third certain node apparatus.

7. A non-transitory computer readable medium according to claim 2, wherein the storage resource further stores control information indicating whether the execution of (D) through (E) regarding a certain type of node apparatuses is enabled or disabled.

8. A non-transitory computer readable medium according to claim 2, the computer program further causing the computer to execute:

(F) identifying a second certain node apparatus which is added, by receiving composition information from the node apparatuses; and (G) creating a second part of the event cause information which is related to the second certain node apparatus, based on one or more of the event cause models related to the certain node apparatus and a new element relations related to the second certain node apparatus.

9. A non-transitory computer readable medium according to claim 2, the computer program further causing the computer to execute:

(F) identifying a third certain node apparatus which is deleted; and (G) deleting a second part of the event cause information which is related to the third certain node apparatus.

10. A method according to claim 3, wherein the storage resource further stores control information indicating whether the execution of (D) through (E) regarding a certain type of node apparatuses is enabled or disabled.

11. A method according to claim 3, further comprising:

(F) identifying a second certain node apparatus which is added, by receiving composition information from the node apparatuses; and (G) creating a second part of the event cause information which is related to the second certain node apparatus, based on one or more of the event cause models related to the certain node apparatus and a new element relations related to the second certain node apparatus.

12. A method according to claim 3, further comprising:

(F) identifying a third certain node apparatus which is deleted; and (G) deleting a second part of the event cause information which is related to the third certain node apparatus.

* * * * *